US008933653B2

(12) United States Patent
Ichikawa et al.

(10) Patent No.: US 8,933,653 B2
(45) Date of Patent: Jan. 13, 2015

(54) MOTOR CURRENT DETECTION APPARATUS, MOTOR CONTROLLER, AND ELECTRIC POWER TOOL

(71) Applicants: Yoshitaka Ichikawa, Anjo (JP); Motohiro Omura, Anjo (JP); Kenya Yanagihara, Anjo (JP)

(72) Inventors: Yoshitaka Ichikawa, Anjo (JP); Motohiro Omura, Anjo (JP); Kenya Yanagihara, Anjo (JP)

(73) Assignee: Makita Corporation, Anjo-shi (JP)

( * ) Notice: Subject to any disclaimer, the term of this patent is extended or adjusted under 35 U.S.C. 154(b) by 124 days.

(21) Appl. No.: 13/633,325

(22) Filed: Oct. 2, 2012

(65) Prior Publication Data

US 2013/0082627 A1 Apr. 4, 2013

(30) Foreign Application Priority Data

Oct. 3, 2011 (JP) ................................. 2011-219304

(51) Int. Cl.
*H02P 27/08* (2006.01)

(52) U.S. Cl.
USPC ...... 318/139; 318/437; 318/471; 318/400.27; 388/811; 388/937

(58) Field of Classification Search
USPC .......... 318/430–437, 400.01, 400.27, 400.35, 318/720, 139, 471; 388/937, 811; 324/86
See application file for complete search history.

(56) References Cited

U.S. PATENT DOCUMENTS

| | | | | |
|---|---|---|---|---|
| 4,872,127 A * | 10/1989 | Nolan | ................................ | 708/3 |
| 5,289,560 A * | 2/1994 | Abney | .......................... | 388/811 |
| 5,608,300 A * | 3/1997 | Kawabata et al. | ............ | 318/721 |
| 5,767,780 A * | 6/1998 | Smith et al. | .................... | 340/648 |
| 5,911,957 A * | 6/1999 | Khatchatrian et al. | ... | 422/186.07 |
| 6,359,408 B1 * | 3/2002 | Tyckowski | ..................... | 318/469 |
| 7,205,756 B1 * | 4/2007 | Baker | ............................ | 324/86 |
| 7,414,804 B1 * | 8/2008 | Voo | ................................ | 360/67 |
| 7,439,698 B2 * | 10/2008 | Ludwig et al. | ................ | 318/434 |
| 7,529,053 B1 * | 5/2009 | Voo | ................................ | 360/67 |
| 7,679,302 B1 * | 3/2010 | Kremin et al. | ........... | 318/400.35 |
| 7,791,293 B2 * | 9/2010 | Nagase et al. | ........... | 318/400.01 |
| 8,188,696 B2 * | 5/2012 | Shimizu | ................... | 318/400.34 |
| 8,217,609 B1 * | 7/2012 | Kremin et al. | ................ | 318/437 |
| 2006/0017412 A1 * | 1/2006 | Sasaya et al. | ................. | 318/368 |
| 2007/0085526 A1 * | 4/2007 | Baker | ............................ | 324/86 |
| 2008/0030161 A1 * | 2/2008 | Ludwig et al. | ................ | 318/720 |
| 2009/0079373 A1 * | 3/2009 | Nagase et al. | ........... | 318/400.22 |
| 2011/0031917 A1 * | 2/2011 | Shimizu | ................... | 318/400.27 |
| 2013/0027022 A1 * | 1/2013 | Woelfel et al. | ............ | 324/123 R |

FOREIGN PATENT DOCUMENTS

JP    A-2001-103788    4/2001

* cited by examiner

*Primary Examiner* — Paul Ip
(74) *Attorney, Agent, or Firm* — Oliff PLC

(57) ABSTRACT

A motor current detection apparatus in the present invention includes: a current detection unit, a first filter, and a second filter. The detection unit detects a conduction current flowing from a battery to a brushless motor and outputs a conduction current signal corresponding to the detected conduction current. The first filter extracts a first current signal which is included in the conduction current signal outputted from the detection unit and is a signal component in a frequency band equal to or lower than a predetermined first cutoff frequency. The second filter extracts a second current signal which is included in the conduction current signal outputted from the detection unit and is a signal component in a predetermined frequency band within a frequency band equal to or lower than a predetermined second cutoff frequency higher than the first cutoff frequency and having the second cutoff frequency as a maximum value.

14 Claims, 12 Drawing Sheets

MOTOR CURRENT DETECTION APPARATUS, MOTOR CONTROLLER, AND ELECTRIC POWER TOOL

CROSS-REFERENCE TO RELATED APPLICATIONS

This application claims the benefit of Japanese Patent Application No. 2011.219304 filed Oct. 3, 2011 in the Japan Patent Office, the disclosure of which is incorporated herein by reference.

BACKGROUND

The present invention relates to a motor current detection apparatus to detect a current flowing in a brushless motor, a motor controller to control the brushless motor using the current detected by the motor current detection apparatus, and an electric power tool which is provided with a brushless motor as a drive source.

There is a known electric power tool which is provided with a protection function to protect the motor from overcurrent. A specific example of such protection function against overcurrent is disclosed in Japanese Unexamined Patent Application Publication No. 2001-103788. Specifically, there is disclosed a technique to detect a current flowing in a motor through an integration circuit, and restrict current conduction to the motor in a case where a first overcurrent (for example, 1.8 times of a rated current) flows, or in a case where a second overcurrent (for example, 1.5 times of a rated current), which is lower than the first overcurrent, continuously flows for a predetermined time period (for example, 3 seconds).

SUMMARY

There is a known electric power tool provided with a battery and a brushless motor and configured to perform PWM control of the current conduction from the battery to the brushless motor. The electric power tool of this type is also required to have a protection function against overcurrent since an overcurrent may flow from the battery to the brushless motor when the motor is locked or overloaded. The protection function in this case may be the same as the protection function in the aforementioned specific example.

In recent years, however, new protection functions have been desired resulting from development of higher-power and higher-efficiency brushless motors. More specifically, a higher-power and higher-efficiency brushless motor leads to reduction in impedance of the brushless motor, and also reduction in an ON-resistance in a switching device (for example, an FET) constituting a current conduction control circuit that performs PWM control of the current conduction to the brushless motor, and thus a lock current becomes larger.

That is, in the electric power tool provided with such higher-power and higher-efficiency brushless motor, it is required to protect the battery and the switching device (FET) from a large current flowing when the motor is locked or overloaded. In addition, the battery and the FET should not be protected based on a same detected current, but be protected based on respective appropriate currents to be detected.

Specifically, the FET should be protected such that a current actually flowing in the FET (i.e., an instantaneous current) will not exceed a rated current of the FET. The battery should be protected based on an average value of a current (an average current) flowing from the battery to the brushless motor.

As described above, in the electric power tool provided with the higher-power and higher-efficiency brushless motor, different currents should be detected for the respective objects to be protected (the battery and the FET). Accordingly, the same technique of the protection function as in the aforementioned specific example cannot be employed, and thus a new current detection method and a new protection method are required.

Moreover, in the electric power tool using the battery, it is unfavorable to employ a complex circuit configuration or a configuration requiring a large power consumption for current detection and protection, and it is desirable to employ a simple configuration which allows appropriate detection of currents to be detected for respective objects to be protected, and allows appropriate protection of the respective objects to be protected based on detected values.

Therefore, in the present invention, it is desirable to allow at least one of appropriate detection of an average current and an instantaneous current flowing from a battery to a brushless motor using respective simple configurations, and appropriate protection, from overcurrent, of the battery and control elements which control current conduction from the battery to the brushless motor.

A motor current detection apparatus in one aspect of the present invention includes a current detection unit, a first filter, and a second filter. The current detection unit detects a conduction current flowing from a battery to a brushless motor and output a conduction current signal corresponding to the detected conduction current. The first filter extracts a first current signal which is included in the conduction current signal outputted from the current detection unit and is a signal component in a frequency band equal to or lower than a predetermined first cutoff frequency. The second filter extracts a second current signal which is included in the conduction current signal outputted from the current detection unit and is a signal component in a predetermined frequency band within a frequency band equal to or lower than a predetermined second cutoff frequency higher than the first cutoff frequency and having the second cutoff frequency as a maximum value.

In the motor current detection apparatus configured as above, one current detection unit to detect the conduction current flowing to the brushless motor, and the first current signal and the second current signal are respectively extracted from the conduction current signal outputted from the one current detection unit using the first filter and the second filter. These filters have different passbands. The first cutoff frequency is set for the first filter, while the second cutoff frequency higher than the first cutoff frequency and the predetermined frequency band having the second cutoff frequency as a maximum value are set for the second filter.

By using one current detection unit and two filters having different passbands as described above, it is possible to appropriately extract both the first current signal and the second current signal in different frequency bands by means of simple configurations. Especially for the second current signal, an appropriate signal with high-frequency noises eliminated may be obtained.

These filters may have any configurations. For example, the second filter may be configured as a bandpass filter which can extract signal components in the aforementioned predetermined frequency band. Alternatively, both the first and second filters may be configured as low-pass filters. Specifically, the first filter may be a low-pass filter that extracts the first current signal in the frequency band equal to or lower than the first cutoff frequency from the conduction current signal, and the second filter may be a low-pass filter that extracts the second current signal in the frequency band equal to or lower than the second cutoff frequency from the conduction current signal.

To configure both the first filter and the second filter as low-pass filters allows efficient designing of the first filter and the second filter, and also allows simplified configurations of the first filter and the second filter.

Each of the cutoff frequencies of the first filter and the second filter may be appropriately set as long as a current signal in a desired frequency band can be extracted. For example, in a case where the conduction current flowing from the battery to the brushless motor is PWM controlled at a predetermined PWM frequency, the first cutoff frequency may be set to a value lower than the PWM frequency and higher than zero, and the second cutoff frequency may be set to a value equal to or higher than the PWM frequency.

When the first cutoff frequency is set to a value lower than the PWM frequency, it is possible to extract the first current signal appropriately and highly accurately without being affected by the PWM control. Also, when the second cutoff frequency is set to a value equal to or higher than the PWM frequency, it is possible to extract the second current signal, which includes a signal component having the PWM frequency, appropriately and highly accurately.

In PWM control of a brushless motor, for example, in a case where the brushless motor is used in an electric power tool, a frequency within, for example, a range from a vicinity of 10 kHz to several dozen kHz is used as the PWM frequency in actual cases. Therefore, in light of such actual cases, the first cutoff frequency may be set to, for example, a value within a range of 100 Hz to 5 kHz, and the second cutoff frequency may be set to, for example, a value within a range of 10 kHz to 500 kHz. By setting the first cutoff frequency and the second cutoff frequency as such, the first filter and the second filter favorably corresponding to the PWM frequency to be actually used may be realized.

The first filter and the second filter may be constituted by analog filters, the first filter outputting the first current signal as an analog signal and the second filter outputting the second current signal as an analog signal.

Alternatively, the first filter and the second filter may be constituted by digital filters, the first filter outputting the first current signal as a digital signal and the second filter outputting the second current signal as a digital signal.

Alternatively, the second filter may be constituted by an analog filter and output the second current signal as an analog signal, and the first filter may be constituted by a digital filter that is inputted with the second current signal outputted from the second filter, extract the first current signal from the second current signal, and output the first current signal as a digital signal.

In the case where both the first filter and the second filter are constituted by analog filters, it is possible to extract the first current signal and the second current signal more rapidly than in the case where both the first filter and the second filter are constituted by digital filters.

On the other hand, in the case where both the first filter and the second filter are constituted by digital filters, hardware configuration may be simplified by realizing the first filter and the second filter by means of software processing by a microcomputer, as compared with the case where both the first filter and the second filter are constituted by analog filters.

In the case where the second filter is constituted by an analog filter to output the second current signal as an analog signal, and the first filter is constituted by a digital filter to extract the first current signal from the second current signal, hardware configuration may be simplified and also the second current signal may be extracted more rapidly as compared with the case where both the first filter and the second filter are constituted by analog filters.

The analog filter may be constituted as a passive filter including a resistor and a capacitor (each of which is a passive device). By constituting the analog filter as a passive filter, a configuration of the analog filter may be further simplified.

A motor controller in another aspect of the present invention includes the aforementioned motor current detection apparatus, a current conduction control unit, a first overcurrent determination unit, and a second overcurrent determination unit. The current conduction control unit controls current conduction from the battery to the brushless motor. The first overcurrent determination unit determines that a first current corresponding to the first current signal is an overcurrent in a case where a value of the first current signal extracted by the first filter exceeds a previously set first threshold value. The second overcurrent determination unit determines that a second current corresponding to the second current signal is an overcurrent in a case where a value of the second current signal extracted by the second filter exceeds a previously set second threshold value larger than the first threshold value. The current conduction control unit also performs one of interruption and restriction of current conduction from the battery to the brushless motor in a case where it is determined by at least one of the first overcurrent determination unit and the second overcurrent determination unit that at least one of the first current and the second current is an overcurrent.

According to the motor controller of the present invention configured as above, it is determined whether or not any of the first current and the second current is an overcurrent based on the value of the first current signal and the value of the second current signal, and the first threshold value and the second threshold value. If any one of the first current and the second current is determined to be an overcurrent, current conduction from the battery to the brushless motor is interrupted or restricted. Accordingly, it is possible to appropriately determine that any of the first current and the second current is an overcurrent, and appropriately protect the battery and the current conduction control unit from the overcurrent based on the determination results.

The first overcurrent determination unit may immediately determine that the first current is an overcurrent simply based on the fact that the value of the first current signal exceeds the first threshold value. Alternatively, the first overcurrent determination unit may determine that the first current is an overcurrent when a state, where the value of the first current signal exceeds the first threshold value, has continued for a predetermined threshold value exceeding time period or more. In this case, if the first current is an average current of a conduction current, overcurrent determination regarding the average current may be performed more appropriately.

In the case where both the first filter and the second filter are constituted by analog filters, the first overcurrent determination unit and the second overcurrent determination unit may be realized by means of software processing by a microcomputer. Specifically, extraction of the first current signal and the second current signal is performed by analog filters, and overcurrent determination based on the extracted first current signal and second current signal is performed by means of software processing.

According to the motor controller configured as above, overcurrent determination may be performed rapidly and reliably with a simple configuration.

In the case where the first filter and the second filter are constituted by analog filters, the first overcurrent determination unit may include an analog first comparison circuit that compares the value of the first current signal and the first threshold value, and outputs a first comparison signal having one of a High level and a Low level depending on whether or not the value of the first current signal exceeds the first threshold value. Also, the first overcurrent determination unit may determine that the first current is an overcurrent in a case where the first comparison signal from the first comparison circuit has a level indicating that the value of the first current signal exceeds the first threshold value. In this case, the second overcurrent determination unit may include an analog second comparison circuit that compares the value of the second current signal and the second threshold value, and outputs a second comparison signal having one of a High level and a Low level depending on whether or not the value of the second current signal exceeds the second threshold value. Also, the second overcurrent determination unit may determine that the second current is an overcurrent in a case where the second comparison signal from the second comparison circuit has a level indicating that the value of the second current signal exceeds the second threshold value.

According to the motor controller configured as above, software processing by a microcomputer is substantially unnecessary although the analog first comparison circuit and the analog second comparison circuit are necessary to make a determination on whether or not an overcurrent occurs. Accordingly, overcurrent determination may be performed rapidly and reliably with a simple configuration.

The first overcurrent determination unit may immediately determine that the first current is an overcurrent based on the fact that the first comparison signal having the level indicating that the value of the first current signal exceeds the first threshold value is outputted from the first comparison circuit. Alternatively, the first overcurrent determination unit may determine that the first current is an overcurrent when a state, where the value of the first current signal exceeds the first threshold value, has continued for a predetermined time period. In this case, the first overcurrent determination unit may include a time measurement unit that measures a time for which output of the first comparison signal having a level indicating that the value of the first current signal exceeds the first threshold value continues. Further, the first overcurrent determination unit may determine that the first current is an overcurrent when a measured time by the time measurement unit exceeds a predetermined threshold value exceeding duration. With such configuration, if the first current is an average current of a conduction current, overcurrent determination regarding the average current may be performed more appropriately.

In the case where both the first filter and the second filter are constituted by digital filters, the first filter, the second filter, the first overcurrent determination unit, and the second overcurrent determination unit may be realized by means of software processing by a microcomputer.

In the case where the second filter is constituted by an analog filter to output the second current signal as an analog signal and the first filter is constituted by a digital filter that extracts the first current signal from the second current signal, the first filter, the first overcurrent determination unit, and the second overcurrent determination unit may be realized by means of software processing by a microcomputer. In either of the above cases, use of hardware (analog circuits) may be suppressed, and the first filter, the second filter, the first overcurrent determination unit, and the second overcurrent determination unit may be realized with respective simple configurations.

An electric power tool in yet another aspect of the present invention includes, a battery, a brushless motor as a drive source to be rotated by electric power supplied from the battery, and the aforementioned motor current detection apparatus. According to the electric power tool configured as above, the same effect as in the aforementioned motor current detection apparatus may be exhibited.

An electric power tool in a further aspect of the present invention includes a battery, a brushless motor as a drive source to be rotated by electric power supplied from the battery, and the aforementioned motor controller. According to the electric power tool configured as above, the same effect as in the aforementioned motor controller may be exhibited.

BRIEF DESCRIPTION OF THE DRAWINGS

The present invention will now be described by way of example with reference to the accompanying drawings, in which.

DETAILED DESCRIPTION OF THE PREFERRED EMBODIMENTS

First Embodiment

Figure 1:
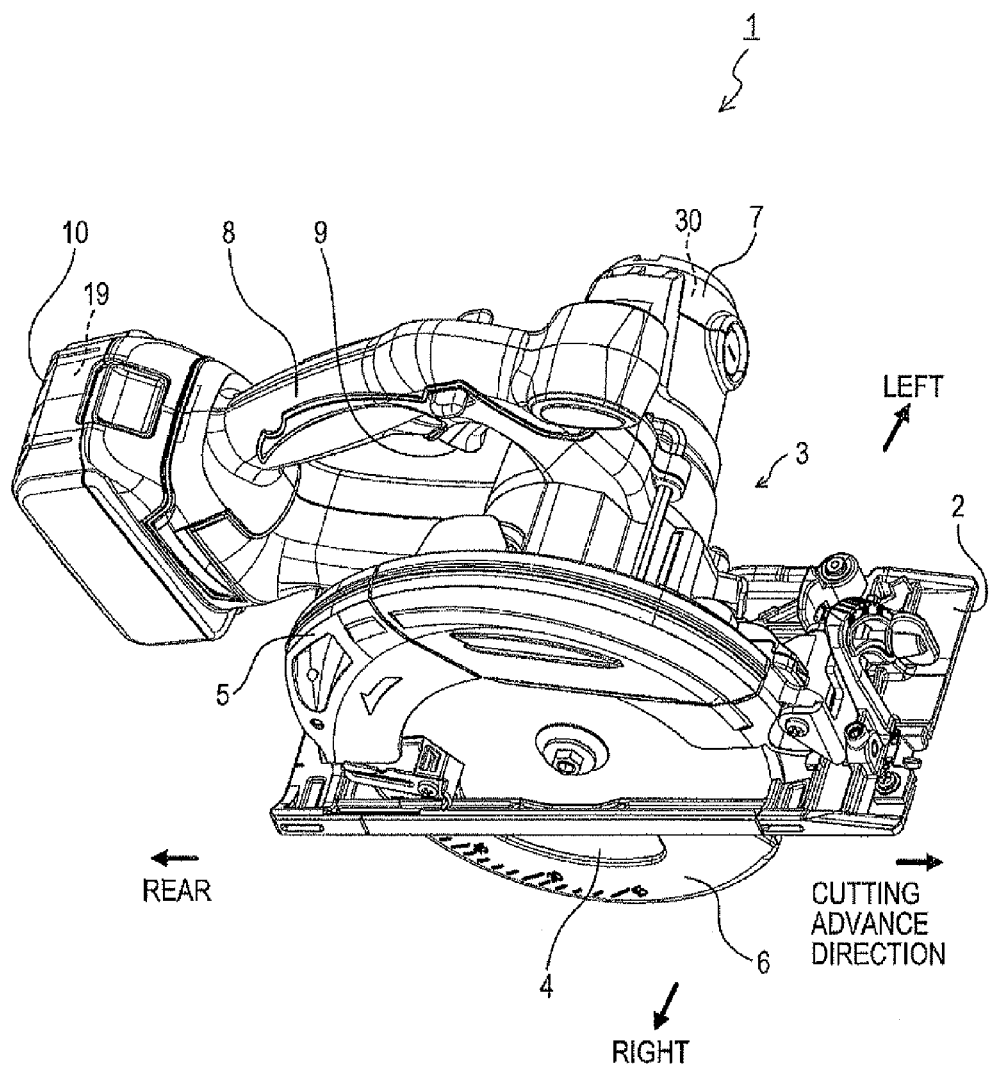
FIG. 1 is a perspective view showing an appearance of an electric power tool in a first embodiment to which the present invention is applied.

As shown in FIG. 1, an electric power tool 1 of the present embodiment is constituted as a rechargeable circular saw.

Specifically, the electric power tool 1 is provided with a substantially rectangular base 2 to be abutted on an upper surface of a workpiece to be cut (not shown), and a main body portion 3 disposed on an upper surface side of the base 2.

The main body portion 3 includes a circular saw blade 4 and a saw blade case 5 which covers and contains therein substantially an upper half of a circumferential periphery of the saw blade 4. Substantially a lower half of the circumferential periphery of the saw blade 4 is covered with a retractable cover 6. By moving the electric power tool 1 in a cutting advance direction during cutting of the workpiece, the cover 6 is rotated in a clockwise direction in FIG. 1 around a rotation center of the saw blade 4 to thereby gradually become opened. As a result, the saw blade 4 is exposed and an exposed portion of the saw blade 4 cuts into the workpiece.

A substantially cylindrical motor case 7 is provided on a left side of the main body portion 3. The motor case 7 contains therein a brushless motor (hereinafter simply referred to as "motor") 30 as a drive source of the electric power tool 1. A not-shown gear mechanism is contained between the motor case 7 and the saw blade 4, and rotation of the motor 30 is transmitted to the saw blade 4 through the gear mechanism.

A handle 8 to be grabbed by a user of the electric power tool 1 is provided on an upper side of the main body portion 3. The handle 8 is attached to the upper side of the main body portion 3 so as to form an arch shape. Specifically, one end of the handle 8 is fixed to a vicinity of a rear end of the main body portion 3, while the other end of the handle 8 is fixed to the main body portion 3 at a position on a side of the cutting advance direction from the rear end of the main body portion 3.

At the rear end of the main body portion 3, a battery pack 10 containing a repeatedly rechargeable battery (a rechargeable cell) 19 is detachably attached to the main body portion 3. A trigger-type operation switch 9 is provided on an inner circumferential side (i.e., on a side facing an upper surface of the main body portion 3) of the handle 8. The main body portion 3 contains therein a motor controller 20 (see FIG. 2) which operates receiving electric supply from the battery 19 in the battery pack 10 and rotates the motor 30 while the operation switch 9 is operated (and thus rotates the saw blade 4).

Figure 2:
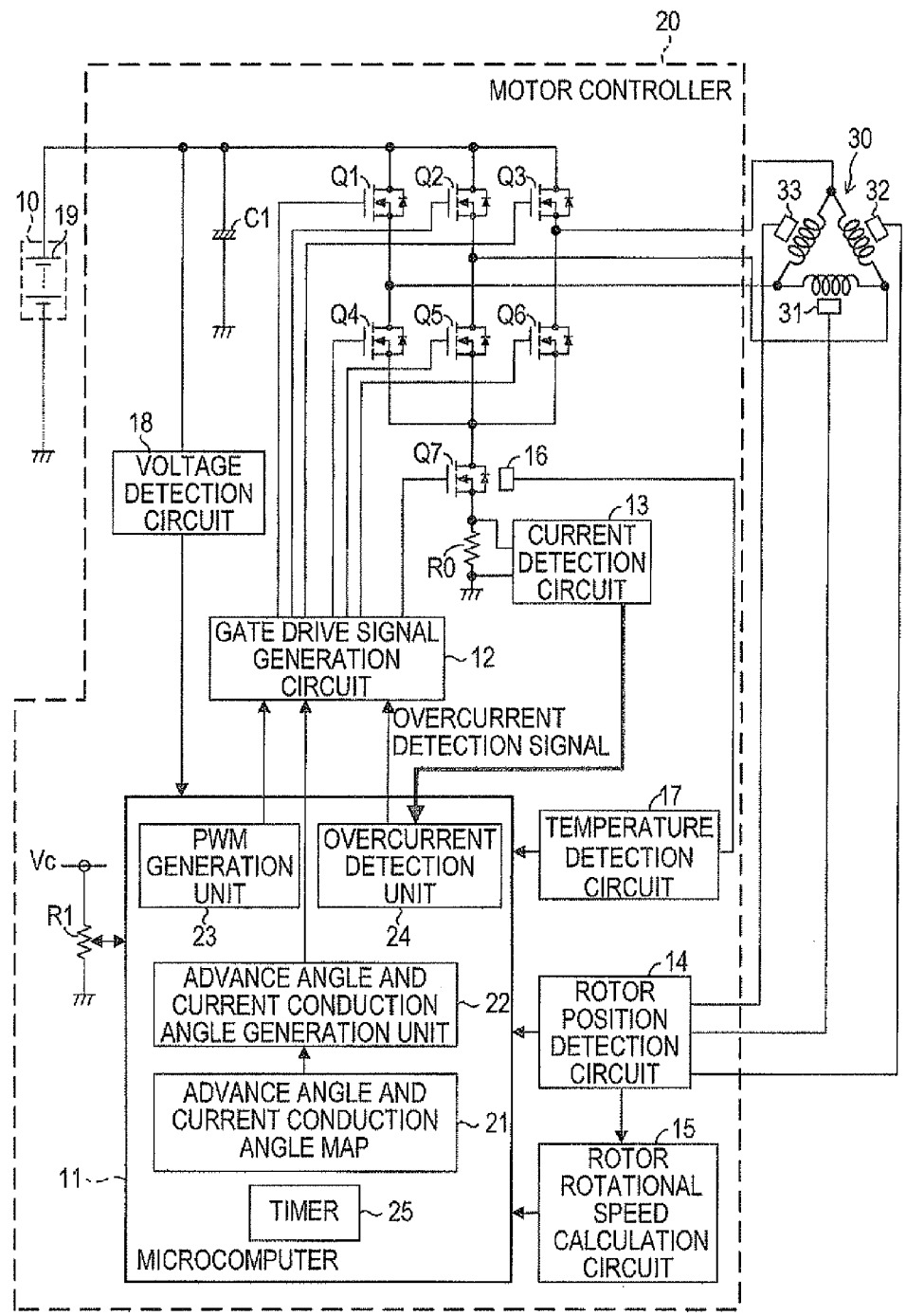
FIG. 2 is a configuration diagram showing an overall configuration of a motor controller in the first embodiment.

As shown in FIG. 2, the motor 30 in the present embodiment is constituted as a three-phase brushless motor, and terminals for respective phases of the motor 30 are connected to the battery pack 10 (more specifically, the battery 19) through the motor controller 20.

The motor controller 20 includes a full-bridge circuit constituted by three switching devices (a U-phase high side switch Q1, a V-phase high side switch Q2, and a W-phase high side switch Q3) as so-called high side switches (upper arm), and three switching devices (a U-phase low side switch Q4, a V-phase low side switch Q5, and a W-phase low side switch Q6) as so-called low side switches (lower arm). The high side switches connect the terminals for the respective phases of the motor 30 and a positive electrode of the battery 19, while the low side switches connect the terminals for the respective phases of the motor 30 and a negative electrode of the battery 19.

In the present embodiment, each of the switching devices Q1 to Q6 constituting the full-bridge circuit is constituted by an n-channel MOSFET. Respective gates of the switching devices Q1 to Q6 are connected to a gate drive signal generation circuit 12, which turns on each of the switching devices Q1 to Q6 by applying a gate drive signal, having a voltage of a predetermined value or more, between each gate and source of the each of the switching devices Q1 to Q6.

In the present embodiment, the sources of the three switching devices Q4 to Q6 as the low side switches are not directly connected to the ground, which is an electric potential of a negative electrode of the battery 19, but is connected to the ground through a switching device for current interruption (a current interruption switch) Q7 and a current detection resistor R0. In the present embodiment, the current interruption switch Q7 is also constituted as an n-channel MOSFET.

Specifically, the sources of the low side switches Q4, Q5, and Q6 of respective phases are connected to a drain of the current interruption switch Q7. A source of the current interruption switch Q7 is connected to one end of the current detection resistor R0, while the other end of the current detection resistor R0 is connected to the ground. A gate of the current interruption switch Q7 is connected to the gate drive signal generation circuit 12, and the current interruption switch Q7 is turned on/off in accordance with a gate drive signal from the gate drive signal generation circuit 12.

The gate drive signal generation circuit 12 is controlled by a microcomputer 11. The current detection resistor R0 is for use to detect a conduction current at the time of current conduction from the battery 19 to the motor 30. In the present embodiment, the single current detection resistor R0 is provided. A voltage between both ends of the current detection resistor R0 are inputted into a current detection circuit 13 as a conduction current signal corresponding to a value of the conduction current flowing from the battery 19 to the motor 30. The current detection circuit 13 independently extracts, from the conduction current signal, an average current signal corresponding to an average value (an average current value) of the current flowing from the battery 19 to the motor 30 and an instantaneous current signal corresponding to an actual value (an instantaneous current value) of the current flowing from the battery 19 to the motor 30, and then outputs the signals to the microcomputer 11.

Also, the motor controller 20 includes a rotor position detection circuit 14 and a rotor rotational speed calculation circuit 15. The rotor position detection circuit 14 detects a rotational position of the motor 30 (thus a rotational position of the rotor constituting the motor 30). The rotor rotational speed calculation circuit 15 calculates a rotational speed of the motor 30 (thus a rotational speed of the rotor) based on the rotational position detected by the rotor position detection circuit 14.

The rotor position detection circuit 14 detects the rotational position of the rotor based on rotation detection signals from respective rotational position sensors 31, 32, and 33 provided in the motor 30. The rotational position sensors 31, 32, and 33 are constituted as Hall ICs, and are arranged to be separated from one another by an electric angle of 120 degrees in the motor 30. Each of the rotational position sensors 31, 32, and 33 outputs a pulse signal to the rotor position detection circuit 14 in accordance with the rotational position of the motor 30 (that is, each time the motor 30 has rotated a predetermined amount). The rotor position detection circuit 14 detects the rotational position of the motor 30 based on the pulse signals from the rotational position sensors 31, 32, and 33.

While the operation switch 9 is operated, the microcomputer 11 outputs to the gate drive signal generation circuit 12 a current conduction command directing a current conduction angle and an advance angle based on the rotor position detected by the rotor position detection circuit 14.

The microcomputer 11 previously stores an advance angle and current conduction angle map 21 for use to set an advance angle and a current conduction angle in accordance with a value of a conduction current and a rotational position of the rotor. Based on the value of the conduction current detected by the current detection circuit 13 and the rotational position of the rotor detected by the rotor position detection circuit 14, an advance angle and current conduction angle generation unit 22 refers to the advance angle and current conduction angle map 21 and generates a current conduction command indicating an advance angle and a current conduction angle corresponding to a value of the conduction current and the rotational position of the rotor, and outputs the current conduction command to the gate drive signal generation circuit 12.

Also, the microcomputer 11 includes a PWM generation unit 23 that calculates a drive duty ratio to perform PWM control of current conduction to the motor 30, generates a PWM command indicating the drive duty ratio and outputs the PWM command to the gate drive signal generation circuit 12. That is, the microcomputer 11 is configured to perform PWM control of the current conduction from the battery 19 to the motor 30 at a predetermined PWM frequency.

The PWM generation unit 23 calculates the drive duty ratio by performing feedback control such that the rotational speed calculated by the rotor rotational speed calculation circuit 15 coincides with a set rotational speed determined depending on an operation state of the operation switch 9.

At the time of current conduction to the motor 30 resulting from an operation of the operation switch 9, the gate drive signal generation circuit 12 turns on the current interruption switch Q7 as well as turns on one of the high side switches Q1 to Q3 and one of the low side switches Q4 to Q6, which constitute the full bridge circuit, in accordance with the current conduction command from the advance angle and current conduction angle generation unit 22, to thereby conduct current to the motor 30.

Further, at the time of current conduction to the motor 30, one of the high side switch and the low side switch to be turned on is not constantly kept turned on during an ON period indicated by the current conduction command but is turned on/off (duty driven) at a predetermined frequency (a PWM frequency) using a drive duty ratio indicated by the PWM command from the PWM generation unit 23. In the present embodiment, each of the high side switches Q1 to Q3 is duty driven. In the description hereafter, each of the high side switches Q1 to Q3 which is duty driven is also referred to as a drive switch.

For example, in a current conduction period when both the U-phase high side switch Q1 and the V-phase low side switch Q5 are on, the V-phase low side switch Q5 remains in an ON-state, while the U-phase high side switch Q1 as the drive switch is duty driven during the current conduction period. Obviously, however, there is no limitation as to which of the high side switch and the low side switch is to be duty driven, and that may be determined appropriately depending on, for example, an employed control method.

Figure 3:
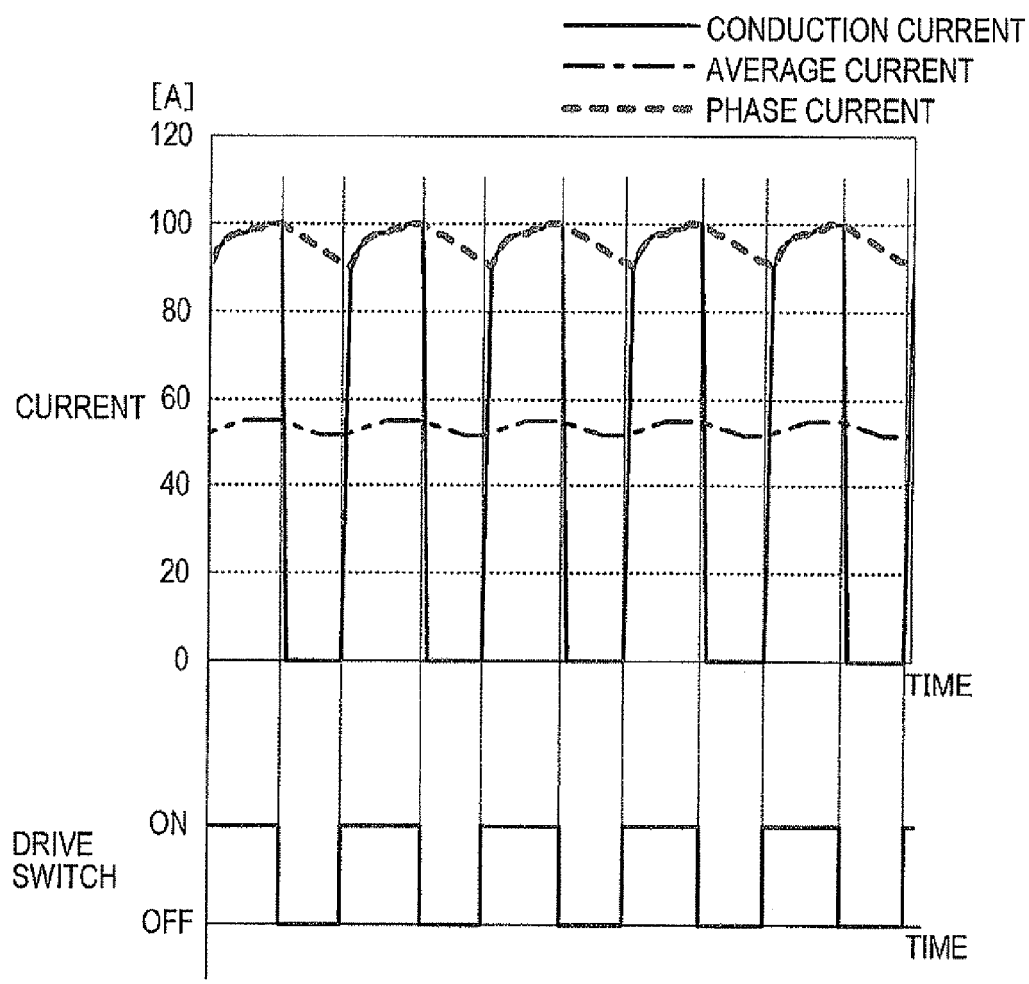
FIG. 3 is an explanatory view showing an example of waveforms of a current flowing from a battery and a current flowing in a drive switch during operation of the electric power tool in the first embodiment.

FIG. 3 shows an example of waveforms of a current flowing from the battery 19 to the motor 30 and a current flowing in the drive switch during current conduction to the motor 30. Among the current waveforms in FIG. 3, a current indicated in a solid line is a current (an instantaneous current) actually flowing from the battery 19 through the motor 30 to the current detection resistor R0 in accordance with turning on/off of the drive switch.

For example, in the aforementioned case of the current conduction period in which both the U-phase high side switch Q1 and the V-phase low side switch Q5 are turned on, when the drive switch (in this example, the U-phase high side switch Q1) is turned on, a current flows from the battery 19 through the switches Q1 and Q5, the motor 30, the current interruption switch Q7, and the current detection resistor R0. When the drive switch is turned off, the current conduction from the battery 19 is interrupted. The conduction current from the battery 19 varying in accordance with turning on/off of the drive switch as described above is detected by the current detection resistor R0.

However, the current actually detected by the current detection resistor R0 includes noises having higher frequency components than the PWM frequency. Accordingly, as described later in the present embodiment, the current detection circuit 13 eliminates the noises from the conduction current signal, to thereby detect the value of the actual current (the instantaneous current) which does not include the noises and varies by PWM control.

On the other hand, when the drive switch is turned off in the aforementioned case, although current conduction from the battery 19 to the motor 30 is interrupted, current conduction to the motor 30 still continues via a circulation path by magnetic energy of phase coils constituting the motor 30. Specifically, when the U-phase high side switch Q1, as the drive switch, is turned off in a state where both the U-phase high side switch Q1 and the V-phase low side switch Q5 are on, a circulation path is formed by the V-phase low side switch Q5 in the ON state and a diode parallely connected between the source and drain of the V-phase low side switch Q4, and a current (a gradually attenuating current) by residual magnetic energy of the motor 30 flows through the circulation path. That is, in the aforementioned case, a current (a phase current) indicated by a dashed line in FIG. 3 constantly flows in the V-phase low side switch Q5 during the current conduction period.

A current indicated by an alternate long and short dash line in FIG. 3 represents an average value of the conduction current (hereinafter, simply referred to as an "average current value") flowing from the battery 19 to the motor 30 while the drive switch is on. As described later, the average current value is detected by the current detection circuit 13 based on the conduction current signal.

The motor controller 20 also includes a not-shown constant voltage power source device, which generates a constant voltage power supplying a specified constant voltage Vc (e.g., 5V) reduced from a voltage of the battery 19 (a battery voltage). The constant voltage power (Vc) is used as a power for operating circuits and the like in various components, including the microcomputer 11, inside the motor controller 20.

The operation switch 9 more specifically includes a not-shown drive start switch and a variable resistor R1 shown in FIG. 2. The variable resistor R1, which is configured as a so-called potentiometer, inputs to the microcomputer 11 a voltage (a trigger operation amount signal) in accordance with an operation amount (a stroke amount) of the operation switch 9 using the constant voltage Vc as a power source.

With the above configuration, when the user starts pulling the operation switch 9 (for example, pulling by a small amount), the drive start switch is turned on, and a drive start signal indicating the turning on of the drive start switch is inputted to microcomputer 11. When the drive start signal is inputted, the microcomputer 11 starts PWM control of the motor 30 in accordance with the trigger operation amount signal from the variable resistor R1 so as to rotate the motor 30 at a target rotational speed in accordance with the operation amount of the operation switch 9 represented by the trigger operation amount signal. Specifically, the PWM generation unit 23 calculates the drive duty ratio such that the larger the stroke amount of the operation switch 9, the higher the rotational speed becomes (i.e., the larger the drive duty ratio becomes).

The motor controller 20 also includes a temperature sensor 16 and a temperature detection circuit 17. The temperature sensor 16 is provided in a vicinity of the current interruption switch Q7 and outputs a signal in accordance with a temperature of the current interruption switch Q7. The temperature detection circuit 17 detects the temperature of the current interruption switch Q7 based on the signal from the temperature sensor 16.

The microcomputer 11 monitors the temperature detected by the temperature detection circuit 17. When the detected temperature exceeds a predetermined temperature threshold value, the microcomputer 11 forcibly turns off the current interruption switch Q7 through the gate drive signal generation circuit 12, to thereby forcibly interrupt current conduction to the motor 30. Also when an abnormality, such as a hang-up, occurs while the microcomputer 11 executes various programs, the microcomputer 11 forcibly turns off the current interruption switch Q7 through the gate drive signal generation circuit 12, to thereby forcibly interrupt current conduction to the motor 30.

The motor controller 20 further includes a voltage detection circuit 18 for detecting the battery voltage. The microcomputer 11 monitors a detection signal from the voltage detection circuit 18 and performs various controls based on the battery voltage, such as stopping operation of the motor 30 if the battery voltage becomes lower than a predetermined level.

The microcomputer 11 also includes an overcurrent detection unit 24 and a timer 25. The overcurrent detection unit 24 determines, based on the average current signal and the instantaneous current signal individually extracted by the current detection circuit 13, whether or not each of the average current and the instantaneous current is an overcurrent. When it is determined that one or both of the average current and the instantaneous current are overcurrents, an overcurrent detection signal indicating the determination result is outputted to the gate drive signal generation circuit 12.

Specifically, when the average current is determined to be an overcurrent, a first overcurrent detection signal indicating that the average current is an overcurrent is outputted, while when the instantaneous current is determined to be an overcurrent, a second overcurrent detection signal indicating that the instantaneous current is an overcurrent is outputted.

The timer 25 performs time measurement in order to determine whether or not the average current is an overcurrent as described later.

Among the aforementioned various components constituting the microcomputer 11, the advance angle and current conduction angle generation unit 22 as well as the PWM generation unit 23 are realized by means of software processing (specifically by a not-shown CPU executing a program) in the present embodiment. Part of the functions of the overcurrent detection unit 24 is also realized by means of software processing, which will be described in detail later.

The timer 25 may be realized by means of hardware or by means of software processing.

Major features of the motor controller 20 in the present embodiment configured as above, are in configurations of the current detection circuit 13 and the overcurrent detection unit 24.

In the electric power tool 1 of the present embodiment, a brushless motor with high output and high efficiency is used as the motor 30. Also, to achieve improved output and efficiency, the switching devices Q1 to Q7, each having a low on-resistance, are employed. Accordingly, there is a risk that a large current exceeding a rated current (an overcurrent) may flow from the battery 19 to the motor 30 when the motor 30 is locked or overloaded. It is, therefore, required to appropriately protect the battery 19 and the switching devices Q1 to Q7 from such overcurrent.

Specifically, to protect the battery 19 from overcurrent, it is required to appropriately detect and monitor the average current conducted from the battery 19 to the motor 30, and to restrict the current conduction when the average current is in an overcurrent condition.

To protect the switching devices Q1 to Q7 from overcurrent, it is also required to appropriately detect and monitor the instantaneous current conducted from the battery 19 to the motor 30 through the switching devices, which is an actual current value varying in synchronization with the PWM control and not containing high-frequency noises and the like, and to restrict the current conduction when the instantaneous current is in an overcurrent condition. That is, it is required to perform current control such that the instantaneous current does not exceed each of the rated levels of the switching devices.

Accordingly, in the present embodiment, it is configured such that the current detection circuit 13 extracts individually an average current signal and an instantaneous current signal from a conduction current signal using two analog low-pass filters (LPFs) having different passbands (i.e., having different time constants). Then, the overcurrent detection unit 24 of the microcomputer 11 determines individually, based on the average current signal and the instantaneous current signal extracted by the respective LPFs of the current detection circuit 13, whether or not each of the average current and the instantaneous current is an overcurrent.

Figure 4:
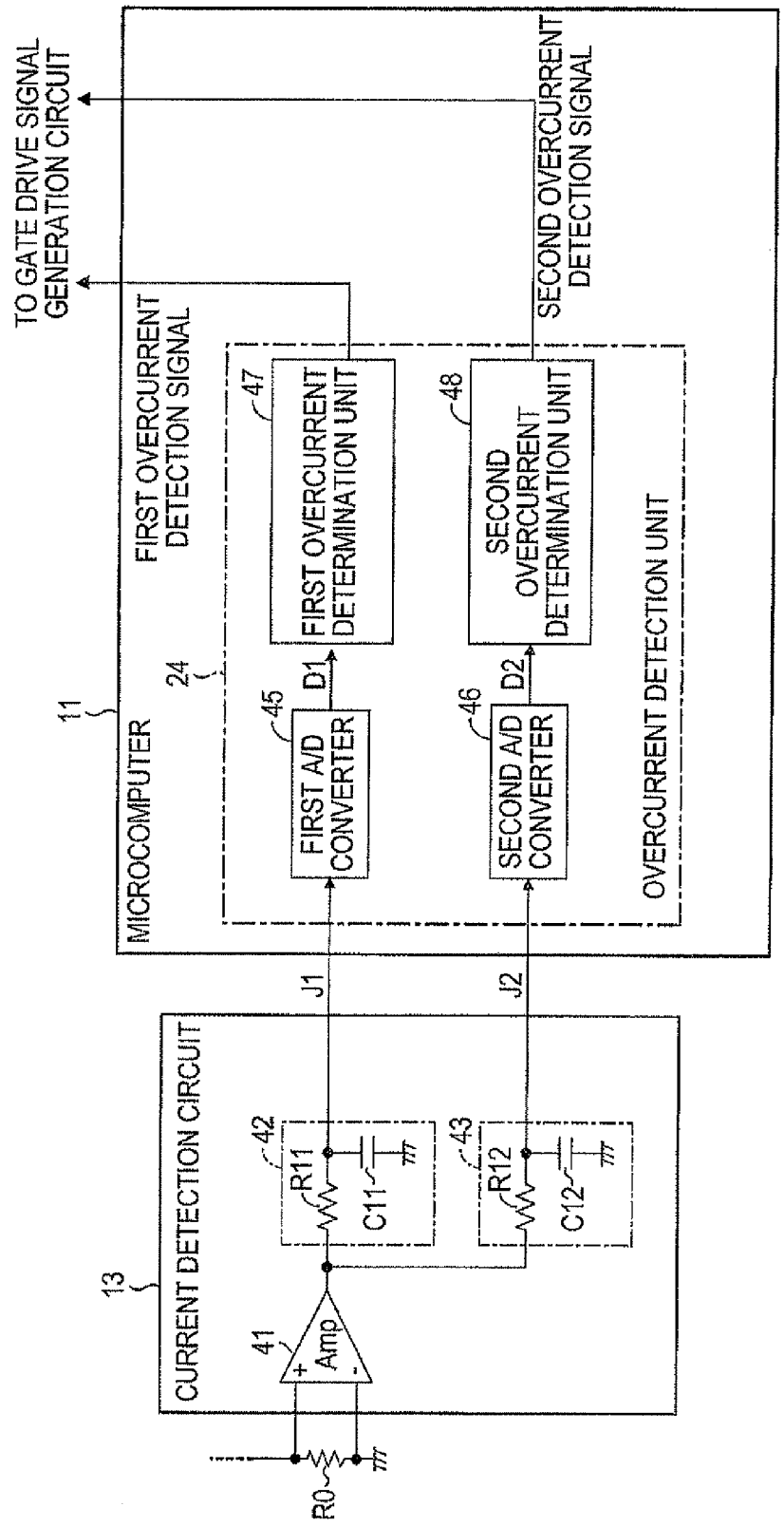
FIG. 4 is a configuration diagram showing specific configurations of a current detection circuit and an overcurrent detection unit in the first embodiment.

FIG. 4 shows specific configurations of the current detection circuit 13 and the overcurrent detection unit 24 in the present embodiment. As shown in FIG. 4, the current detection circuit 13 includes an amplifier 41 for amplifying the conduction current signal and two LPFs (a first LPF 42 and a second LPF 43) that extract signal components in respective desired frequency-bands from the conduction current signal amplified by the amplifier 41. The first LPF 42 is for extracting an average current signal J1 from the amplified conduction current signal, while the second LPF 43 is for extracting an instantaneous current signal J2 from the amplified conduction current signal.

The first LPF 42, which is configured as a known analog passive filter constituted by a resistor R11 and a capacitor C11, outputs the average current signal J1 as an analog signal. Since the first LPF 42 is intended to extract the average current signal J1 to protect the battery 19, the first LPF 42 is configured to have a large time constant, i.e., have a cutoff frequency (a first cutoff frequency) fc1 lower than the PWM frequency, in order not to be affected by the PWM control.

Figure 5:
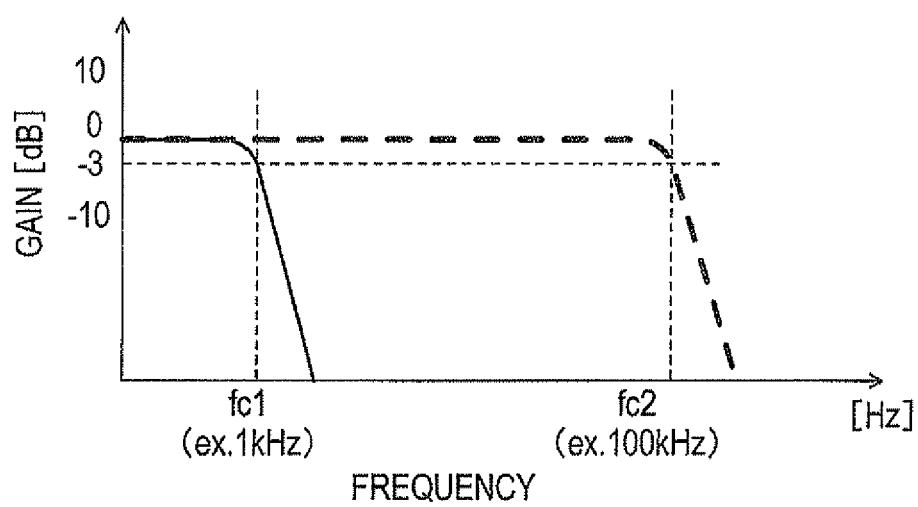
FIG. 5 is an explanatory view for illustrating passbands of respective low-pass filters.

In the present embodiment, the PWM frequency in the PWM control is set within a range of 8 kHz to 20 kHz. Accordingly, the first cutoff frequency fc1 of the first LPF 42 should be set to be lower than the PWM frequency and larger than 0, such as within a range of 100 Hz to 5 kHz. By way of example, a description will be provided regarding a case where the first cutoff frequency fc1 is 1 kHz as indicated by a solid line in FIG. 5.

When the conduction current signal is inputted to the first LPF 42, the average current signal J1, as a signal component in a frequency band equal to or lower than the first cutoff frequency fc1 in the conduction current signal, is extracted.

The second LPF 43, which is a known analog passive filter constituted by a resistor R12 and a capacitor C12, outputs the instantaneous current signal J2 as an analog signal. The second LPF 43 needs to extract at least signal components (the instantaneous current signal J2) which vary in synchronization with the PWM control, for the purpose of protecting the switching devices Q1 to Q7. Therefore, the second LPF 43 is adapted to be capable of extracting a signal of frequency components, including the PWM frequency, and also capable of cutting high-frequency noise components higher than the PWM frequency. That is, the cutoff frequency fc2 of the second LPF 43 is set to a value at least equal to or higher than the PWM frequency.

Since the PWM frequency is set within the range of 8 kHz to 20 kHz as mentioned above in the present embodiment, the second cutoff frequency fc2 of the second LPF 43 is set within a range of, for example, 10 kHz to 500 kHz, which is higher than the PWM frequency and also allow cutting of high-frequency noise components. Accordingly, the time constant of the second LPF 43 is set to a value smaller than the time constant of the first LPF 42. By way of example, a description will be provided regarding a case where the second cutoff frequency fc2 is 100 kHz as indicated by a dashed line in FIG. 5.

When the conduction current signal is inputted to the second LPF 43, the instantaneous current signal J2, as a signal component in the frequency band equal to or lower than the second cutoff frequency fc2 in the conduction current signal, is extracted.

Based on the average current signal J1 and the instantaneous current signal J2 extracted by the LPFs 42 and 43, respectively, the overcurrent detection unit 24 of the microcomputer 11 determines individually whether or not each of the average current and the instantaneous current is an overcurrent. As shown in FIG. 4, the overcurrent detection unit 24 includes a first A/D converter 45, a second A/D converter 46, a first overcurrent determination unit 47, and a second overcurrent determination unit 48. The first A/D converter 45 converts the average current signal J1 into a digital signal. The second A/D converter 46 converts the instantaneous current signal J2 into a digital signal. The first overcurrent determination unit 47 determines whether or not the average current is an overcurrent based on a value of the average current signal (an average current value D1) outputted from the first A/D converter 45, and outputs a first overcurrent detection signal to the gate drive signal generation circuit 12 if the first overcurrent determination unit 47 has determined that the average current is an overcurrent. The second overcurrent determination unit 48 determines whether or not the instantaneous current is an overcurrent based on a value of the instantaneous current signal (an instantaneous current value D2) outputted from the second A/D converter 46, and outputs a second overcurrent detection signal to the gate drive signal generation circuit 12 if the second overcurrent determination unit 48 has determined that the instantaneous current is an overcurrent. Each of the first and second overcurrent determination units 47 and 48 is realized by means of software processing by the microcomputer 11 in the present embodiment.

Figure 6:
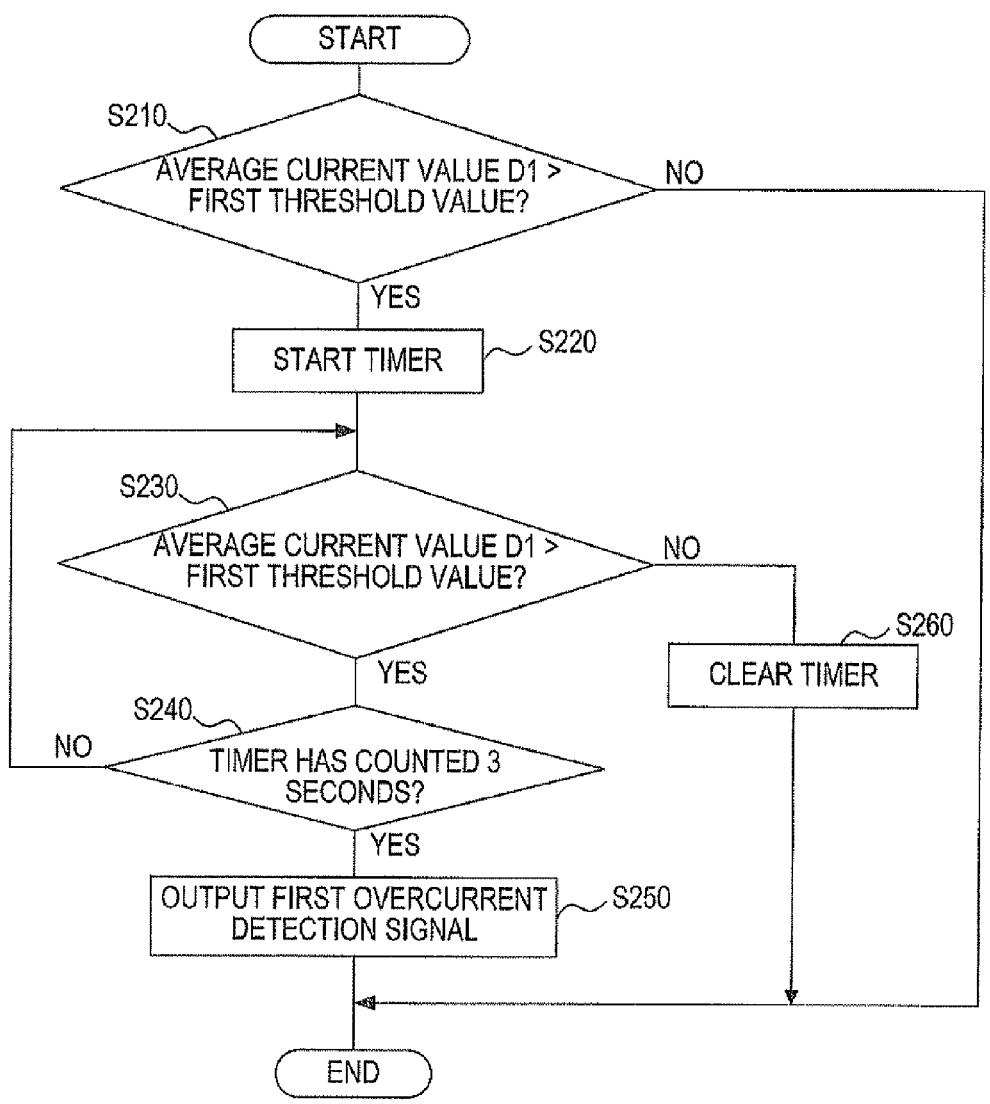
FIG. 6 is a flowchart showing a first overcurrent determination process in the first embodiment.

FIG. 6 shows a flowchart of a first overcurrent determination process, which is a control process as the first overcurrent determination unit 47, to be executed by the microcomputer 11. The microcomputer 11 periodically and repeatedly executes the first overcurrent determination process in FIG. 6 in accordance with a first overcurrent determination process program stored in a not-shown memory at least while the operation switch 9 is being operated.

When starting the first overcurrent determination process, the microcomputer 11 first determines in S210 whether or not the average current value D1 exceeds a first threshold value. In the present example, an appropriate determination standard value (e.g., 60 A) to determine whether or not the average current has reached a level, at which the battery 19 should be protected, is previously set as a digital first threshold value in the not-shown memory or the like.

When the average current value D1 is equal to or less than the first threshold value, the present first overcurrent determination process is immediately terminated. When the average current value D1 exceeds the first threshold value, the process proceeds to S220 and time measurement by the timer 25 provided in the microcomputer 11 is started.

Then in S230, it is determined whether or not the average current value D1 exceeds the first threshold value, as in S210.

When it is determined in S230 that the average current value D1 is equal to or less than the first threshold value, the timer 25 is cleared in S260, and the present first overcurrent determination process is terminated. On the other hand, when it is determined in S230 that the average current value D1 exceeds the first threshold value, it is determined in S240 whether or not a time measured by the timer 25 has reached 3 seconds. Until the measured time has reached 3 seconds, the process returns to S230.

When it is determined in S240 that the measured time by the timer 25 has reached 3 seconds, the process proceeds to S250, and outputs a first overcurrent detection signal to the gate drive signal generation circuit 12. That is, when a state of exceeding the first threshold value has continued for 3 seconds, it is determined that the average current is an overcurrent (in other words, the battery 19 should be protected from the overcurrent) and the determination is transmitted to the gate drive signal generation circuit 12.

In a case where the first overcurrent detection signal is inputted from the first overcurrent determination unit 47, the gate drive signal generation circuit 12 restricts conduction current from the battery 19 to the motor 30 such that the average current value D1 is kept to be equal to or less than the first threshold value by, for example, reducing the drive duty ratio of the PWM control by a predetermined amount.

Figure 7:
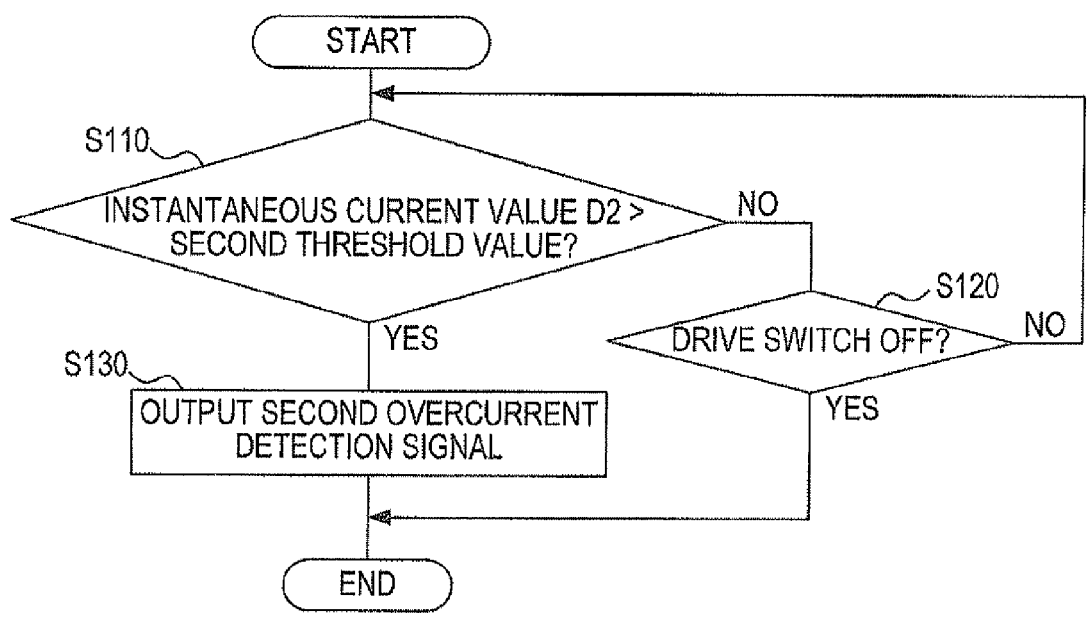
FIG. 7 is a flowchart showing a second overcurrent determination process in the first embodiment.

Next, FIG. 7 shows a flowchart of a second overcurrent determination process, which is a control process as the second overcurrent determination unit 48, to be executed by the microcomputer 11. The microcomputer 11 periodically and repeatedly executes the second overcurrent determination process in FIG. 7 in accordance with a second overcurrent determination process program stored in the not-shown memory at least while the operation switch 9 is being operated.

When starting the second overcurrent determination process, the microcomputer 11 first determines in S110 whether or not the instantaneous current value D2 exceeds a second threshold value. In the present example, an appropriate determination standard value (e.g., 100 A) larger than the first threshold value to determine whether or not the instantaneous current has reached a level, at which the switching devices Q1 to Q7 should be protected, is previously set as a digital second threshold value in the not-shown memory or the like.

When the instantaneous current value D2 is equal to or less than the second threshold value, the process proceeds to S120, and it is determined whether or not the drive switch is turned off. While the drive switch is on, the process returns to S110, and comparative determination with the second threshold value is continuously made. When the drive switch is turned off, the second overcurrent determination process is terminated.

On the other hand, when it is determined in S110 that the instantaneous current value D2 exceeds the second threshold value, the process proceeds S130 and a second overcurrent detection signal is outputted to the gate drive signal generation circuit 12. That is, the instantaneous current exceeding the second threshold value is determined to be an overcurrent (in other words, at least the switching devices currently in the ON state should be protected from the overcurrent), and such determination is transmitted to the gate drive signal generation circuit 12.

In a case where the second overcurrent detection signal is inputted from the second overcurrent determination unit 48, the gate drive signal generation circuit 12 forcibly turns off the drive switches, which are currently ON, for current interruption at least during a current PWM cycle including the current ON period, to thereby limit the instantaneous current value D2 to be equal to or less than the second threshold value. Although the drive switches are turned on as usual in a next PWM cycle, the drive switches are forcibly turned off also in the next PWM cycle if the instantaneous current is again determined to be an overcurrent at that time.

As described above, the electric power tool 1 of the present embodiment includes the motor controller 20 shown in FIG. 2. The motor controller 20 includes one current detection resistor R0 and two LPFs 42 and 43 having different passbands (time constants). The first LPF 42 extracts the average current signal J1 and the second LPF 43 extracts the instantaneous current signal J2.

Accordingly, it is possible to detect both a value of the average current and a value of the instantaneous current appropriately in spite of a simple configuration. Particularly in terms of the value of the instantaneous current, it is possible to obtain more appropriate value with high-frequency noise components eliminated.

In addition, since the first cutoff frequency fc1 of the first LPF 42 is set to a value lower than the PWM frequency, it is possible to detect the value of the average current appropriately and highly accurately without being affected by the PWM control. Also, since the second cutoff frequency fc2 of the second LPF 43 is set to a value equal to or higher than the PWM frequency, it is possible to detect the value of the instantaneous current containing PWM frequency components appropriately and highly accurately.

The microcomputer 11 (more specifically, the overcurrent detection unit 24) make determinations on overcurrent, by means of software processing, based on the values of the average current signal J1 and the instantaneous current signal J2 extracted by the respective LPFs 42 and 43 on the basis of the corresponding threshold values or the like. If any of the currents is determined to be an overcurrent, a protective action (such as limiting the drive duty ratio or temporary interrupting current conduction) against the current which has been determined as an overcurrent is performed. Accordingly, it is possible to appropriately determine whether or not each of the average current and the instantaneous current is an overcurrent, and appropriately protect the battery 19 and the switching devices Q1 to Q7 from the overcurrent based on the determination results.

Moreover, the first overcurrent determination unit 47 is configured not to immediately determine an overcurrent simply based on the fact that the average current value D1 exceeds the first threshold value, but to determine an overcurrent when a state where the average current value D1 exceeds the first threshold value continues for a predetermined threshold value exceeding duration (3 seconds in the present example) or longer. Accordingly, overcurrent determination regarding the average current can be performed more appropriately.

Furthermore, overcurrent determination based on the average current signal J1 and the instantaneous current signal J2 extracted by the respective LPFs 42 and 43 is performed by means of software processing by the microcomputer 11. Accordingly, it is possible to perform overcurrent determination with a simple configuration.

Each of the respective LPFs 42 and 43 is constituted as an analog passive filter. Therefore, as compared with a later-described third embodiment, in which each of the LPFs 42 and 43 is constituted as a digital filter, it is possible to promptly extract the average current signal J1 and the instantaneous current signal J2 in spite of its simple configuration.

In the first embodiment, the current detection resistor R0 corresponds to an example of a current detection unit in the present invention, the first LPF 42 corresponds to an example of a first filter in the present invention, and the second LPF 43 corresponds to an example of a second filter in the present invention. Also, in the first embodiment, the microcomputer 11, the gate drive signal generation circuit 12, and the switching devices Q1 to Q7 correspond to an example of a current conduction control unit in the present invention, the timer 25 and the first overcurrent determination unit 47 correspond to an example of a first overcurrent determination unit in the present invention, and the second overcurrent determination unit 48 corresponds to an example of a second overcurrent determination unit in the present invention.

Second Embodiment

Next, a motor controller in a second embodiment will be described. The motor controller of the second embodiment is substantially the same in configuration as the motor controller 20 of the first embodiment except the configurations of the current detection circuit 13 and the overcurrent detection unit 24 in the microcomputer 11. Therefore, the description of the motor controller of the second embodiment will be provided only with respect to a circuit configuration or the like, which is different from the circuit configuration or the like in the motor controller 20 of the first embodiment.

Figure 8:
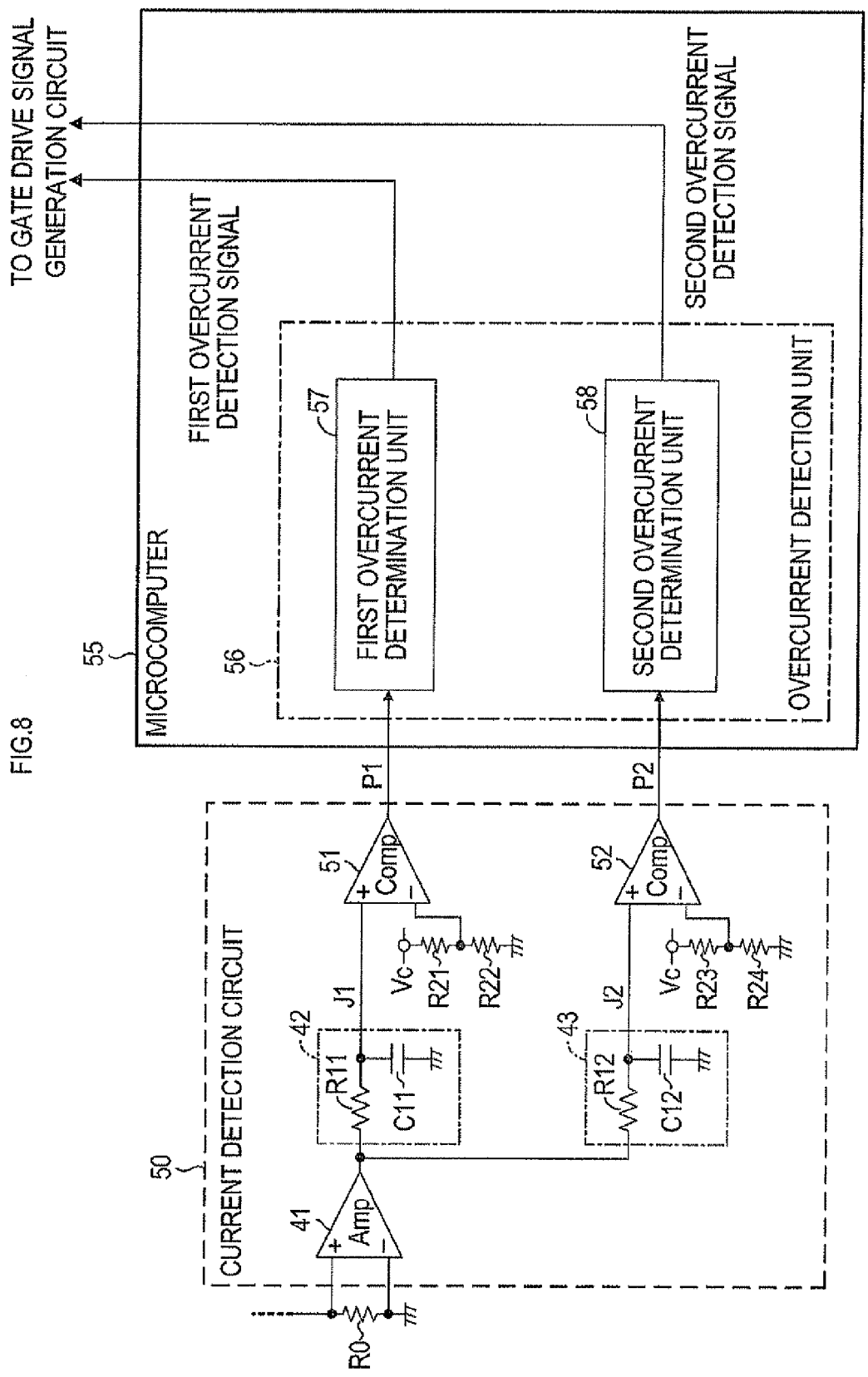
FIG. 8 is a configuration diagram showing specific configurations of a current detection circuit and an overcurrent detection unit in a second embodiment.

FIG. 8 shows specific configurations of a current detection circuit 50 and an overcurrent detection unit 56 in the second embodiment. As shown in FIG. 8, the current detection circuit 50 includes the amplifier 41, the first LPF 42, and the second LPF 43 in a same manner as in the current detection circuit 13 (see FIG. 4) of the first embodiment. In addition, the current detection circuit 50 in the second embodiment includes a first comparator 51 and a second comparator 52.

The first comparator 51 includes a non-inverting input terminal to which the average current signal J1 from the first LPF 42 is inputted, and an inverting input terminal to which a first threshold value is inputted. The first threshold value, which is obtained by dividing the aforementioned constant voltage Vc with two voltage-dividing resistors R21 and R22, and is the same value as the first threshold value (digital value) in the first embodiment when indicated in an analog value.

The first comparator 51 compares a value of the average current signal J1 and the first threshold value. When the value of the average current signal J1 is equal to or less than the first threshold value, the first comparator 51 outputs a voltage signal having a Low level (such as a voltage in a vicinity of 0V) as an average current comparison signal P1 which is an output signal. On the other hand, when the value of the average current signal J1 exceeds the first threshold value, the first comparator 51 outputs a voltage signal having a High level (such as a voltage in a vicinity of 5V) as the average current comparison signal P1.

The second comparator 52 includes a non-inverting input terminal to which the instantaneous current signal J2 from the second LPF 43 is inputted, and an inverting input terminal to which a second threshold value is inputted. The second threshold value, which is obtained by dividing the aforementioned constant voltage Vc with two voltage-dividing resistors R23 and R24, is the same value as the second threshold value (digital value) in the first embodiment when indicated in an analog value.

The second comparator 52 compares a value of the instantaneous current signal J2 and the second threshold value. When the value of the instantaneous current signal J2 is equal to or less than the second threshold value, the second comparator 52 outputs a voltage signal having a Low level (such as a voltage in a vicinity of 0V) as an instantaneous current comparison signal P2 which is an output signal. On the other hand, when the value of the instantaneous current signal J2 exceeds the second threshold value, the second comparator 52 outputs a voltage signal having a High level (such as a voltage in a vicinity of 5V) as the instantaneous current comparison signal P2.

The overcurrent detection unit 56 of the microcomputer 55 determines whether or not each of the average current and the instantaneous current is an overcurrent based on the respective comparison signals P1 and P2 outputted from the respective comparators 51 and 52. As shown in FIG. 8, the overcurrent detection unit 56 of the present embodiment includes a first overcurrent determination unit 57 and a second overcurrent determination unit 58. The first overcurrent determination unit 57 determines whether or not the average current is an overcurrent based on the average current comparison signal P1 from the first comparator 51. The second overcurrent determination unit 58 determines whether or not the instantaneous current is an overcurrent based on the instantaneous current comparison signal P2 from the second comparator 52. In the present embodiment, the first and second overcurrent determination units 57 and 58 are realized by means of software processing by the microcomputer 55 in the same manner as in the overcurrent determination units 47 and 48 of the first embodiment.

Figure 9:
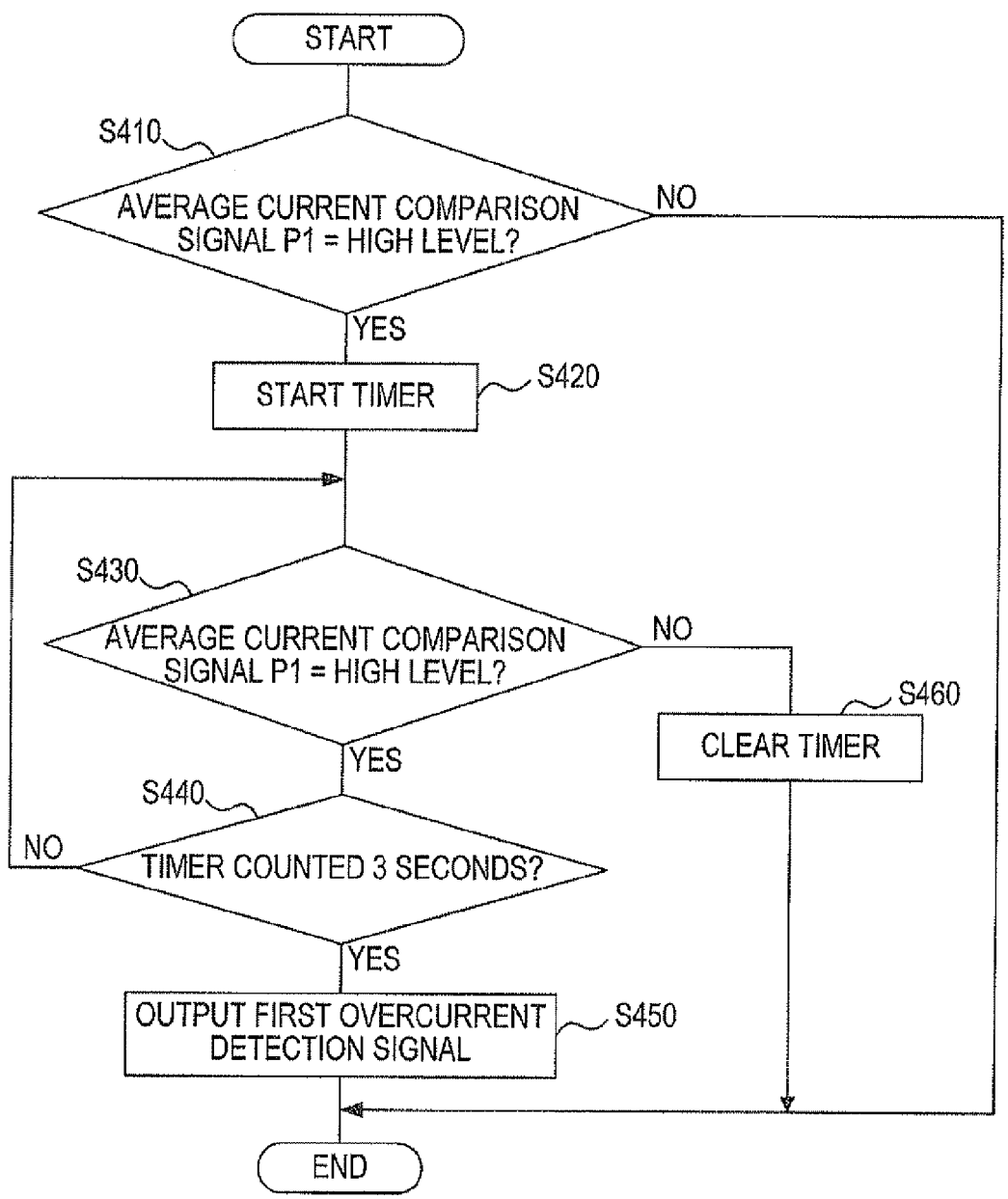
FIG. 9 is a flowchart showing a first overcurrent determination process in the second embodiment.

FIG. 9 shows a flowchart of the first overcurrent determination process, which is a control process as the first overcurrent determination unit 57 executed by the microcomputer 55. When starting the first overcurrent determination process, the microcomputer 55 first determines in S410 whether or not the average current comparison signal P1 is at the High level. When the average current comparison signal P1 is at the Low level, the first overcurrent determination process is immediately terminated, while when the average current comparison signal P1 is at the High level, the process proceeds to S420. In S420, time measurement by the timer 25 provided in the microcomputer 55 is started.

Then, in S430, it is determined whether or not the average current comparison signal P1 is at the High level in the same manner as in S410. When it is determined in S430 that the average current comparison signal P1 is at the Low level, the timer 25 is cleared in S460 and the first overcurrent determination process is terminated. On the other hand, when it is determined in S430 that the average current comparison signal P1 is at the High level, it is determined in S440 whether or not a time measured by the timer 25 has reached 3 seconds. Until the measured time has reached 3 seconds, the process returns to S430.

When it is determined in S440 that the measured time by the timer 25 has reached 3 seconds, the process proceeds to S450, and a first overcurrent detection signal is outputted to the gate drive signal generation circuit 12. That is, when a state where the average current comparison signal P1 is at the High level has continued for 3 seconds, it is determined that the average current is an overcurrent and the determination is transmitted to the drive signal generation circuit 12. An action by the gate drive signal generation circuit 12 (a protective action) in response to the first overcurrent detection signal is the same as in the first embodiment.

Figure 10:
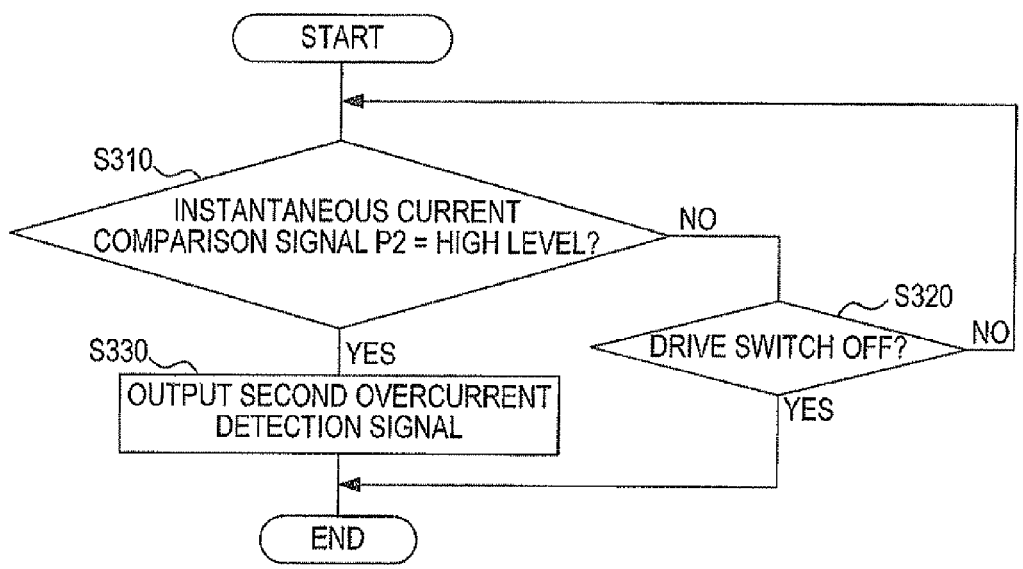
FIG. 10 is a flowchart showing a second overcurrent determination process in the second embodiment.

FIG. 10 shows a flowchart of a second overcurrent determination process, which is a control process as the second overcurrent determination unit 58 executed by the microcomputer 55. When starting the second overcurrent determination process, the microcomputer 55 first determines in S310 whether or not the instantaneous current comparison signal P2 is at the High level. When the instantaneous current comparison signal P2 is at the Low level, the process proceeds to S320, and it is determined whether or not the drive switch is turned off. While the drive switch is on, the process returns to S310, and it is continuously determined whether or not the instantaneous current comparison signal P2 is at the High level. When the drive switch is turned off, the second overcurrent determination process is terminated.

On the other hand, when it is determined in S310 that the instantaneous current comparison signal P2 is at the High level, the process proceeds to S330, and the second overcurrent detection signal is outputted to the gate drive signal generation circuit 12. That is, when the instantaneous current comparison signal P2 is at the High level, it is determined that the instantaneous current is an overcurrent (in other words, at least the switching devices in the ON state should be protected from the overcurrent), and the determination is transmitted to the gate drive signal generation circuit 12. The action by the gate drive signal generation circuit 12 (the protective action) in response to the second overcurrent detection signal is also the same as in the first embodiment.

As described above, in the present embodiment, it is configured such that the average current signal J1 and the instantaneous current signal J2 from the respective LPFs 42 and 43 are not inputted directly to the microcomputer 55 but the values thereof are compared with corresponding threshold values by the respective comparators 51 and 52, and comparison signals P1 and P2 representing respective comparison results are inputted to the microcomputer 55.

Accordingly, as compared with the first embodiment, in determination on overcurrent, a final determination by the microcomputer 55 on whether or not an overcurrent occurs can be significantly simple although comparators 51 and 52 as analog circuits are separately required. Moreover, the A/D converters 45 and 46 provided in the first embodiment are not required in the microcomputer 55 of the present embodiment. As a result, the final determination by the microcomputer 55 on whether or not an overcurrent occurs can be made rapidly.

In the second embodiment, the current detection resistor R0 corresponds to an example of a current detection unit in the present invention, the first LPF 42 corresponds to an example of a first filter in the present invention, and the second LPF 43 corresponds to an example of a second filter in the present invention. Also, in the second embodiment, the timer 25, the first comparator 51, the resistors R21 and R22, and the first overcurrent determination unit 57 correspond to an example of a first overcurrent determination unit in the present invention, and the second comparator 52, the resistors R23 and R24, and the second overcurrent determination unit 58 correspond to an example of a second overcurrent determination unit in the present invention.

Third Embodiment

Next, a motor controller in a third embodiment will be described. The motor controller of the third embodiment is also substantially the same in configuration as the motor controller 20 of the first embodiment except the configurations of the current detection circuit 13 and the overcurrent detection unit 24 in the microcomputer 11. Therefore, the description of the motor controller of the third embodiment will be provided only with respect to a circuit configuration or the like, which is different from the circuit configuration or the like in the motor controller 20 of the first embodiment.

Figure 11:
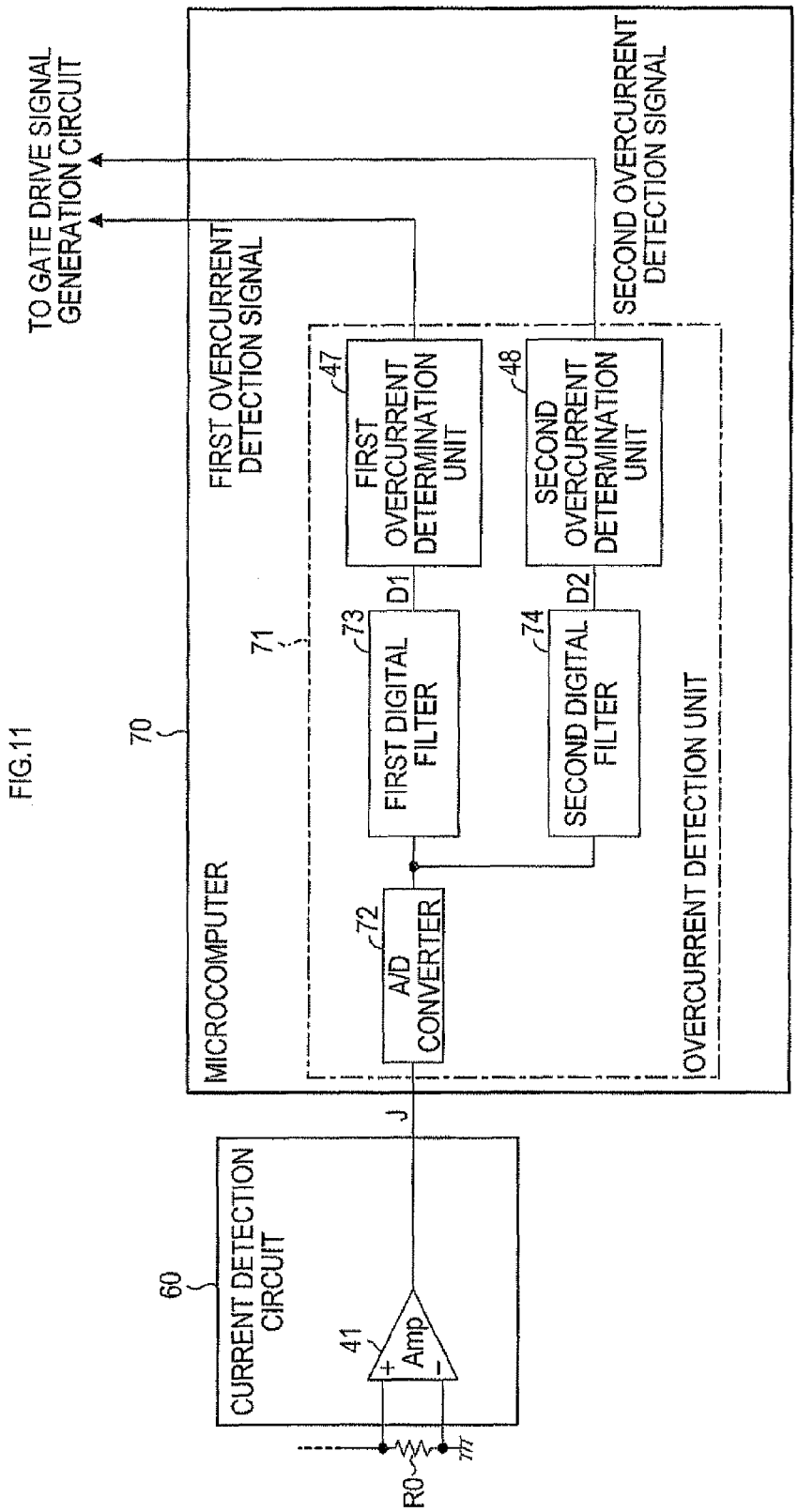
FIG. 11 is a configuration diagram showing specific configurations of a current detection circuit and an overcurrent detection unit in a third embodiment.

FIG. 11 shows specific configurations of a current detection circuit 60 and an overcurrent detection unit 71 in the third embodiment. As shown in FIG. 11, the current detection circuit 60 is constituted by the amplifier 41 provided in the current detection circuit 13 (see FIG. 4) of the first embodiment. That is, the current detection circuit 60 simply inputs a current signal J amplified by the amplifier 41 to a microcomputer 70.

An overcurrent detection unit 71 in the microcomputer 70 includes an A/D converter 72, a first digital filter 73, a second digital filter 74, the first overcurrent determination unit 47, and the second overcurrent determination unit 48. The A/D converter 72 performs A/D conversion of the current signal J inputted from the current detection circuit 60. The first digital filter 73 extracts an average current signal corresponding to components of the frequency band equal to or lower than the first cutoff frequency fc1 from the current signal digitalized by the A/D converter 72. The second digital filter 74 extracts an instantaneous current signal corresponding to components of the frequency band equal to or lower than the second cutoff frequency fc2 from the current signal digitalized by the A/D converter 72. The first overcurrent determination unit 47 determines whether or not the average current is an overcurrent based on a value of the average current signal (an average current value D1) from the first digital filter 73. The second overcurrent determination unit 48 determines whether or not the instantaneous current is an overcurrent based on a value of the instantaneous current signal (an instantaneous current value D2) from the second digital filter 74.

That is, in the first embodiment, the average current signal J1 and the instantaneous current signal J2 are outputted as analog signals by the analog LPFs 42 and 43, respectively, and are A/D-converted by the microcomputer, to thereby obtain the respective average current value D1 and the instantaneous current value D2 as digital values, while in the third embodiment, the first digital filter 73 and the second digital filter 74, which are digital LPFs (respectively having the same cutoff frequencies as in the first embodiment), are provided instead of the LPFs 42 and 43, respectively.

The digital filters 73 and 74 and the overcurrent determination units 47 and 48 in the overcurrent detection unit 71 are all realized by mean of software processing by the microcomputer 70. Since the technique of realizing a digital filter by mean of software processing by a microcomputer is already well-known, further detailed description of the processing will be omitted here. Also, the overcurrent determination units 47 and 48 are the same as the respective overcurrent determination units 47 and 48 in the first embodiment.

In the third embodiment, as described above, the current signal J from the current detection circuit 60 is inputted to the microcomputer 70 as the analog signal without filtering the current signal J by means of hardware. Then, extraction of the average current signal and the instantaneous current signal by the digital filters as well as overcurrent determination are performed by means of software processing by the microcomputer 70.

Accordingly, compared with the configuration using analog filters as in the first embodiment, it is possible to simplify the configuration of the analog circuit since the filters are realized by means of software processing although extraction of the average current signal and the instantaneous current signal is likely to require more time.

In the third embodiment, the current detection resistor R0 corresponds to an example of a current detection unit in the present invention, the first digital filter 73 corresponds to an example of a first filter in the present invention, and the second digital filter 74 corresponds to an example of a second filter in the present invention. Also, in the third embodiment, the timer 25 and the first overcurrent determination unit 47 correspond to an example of a first overcurrent determination unit in the present invention, and the second overcurrent determination unit 48 corresponds to an example of a second overcurrent determination unit in the present invention.

Fourth Embodiment

Next, a motor controller in a fourth embodiment will be described. The motor controller of the fourth embodiment is also substantially the same in configuration as the motor controller 20 of the first embodiment except the configurations of the current detection circuit 13 and the overcurrent detection unit 24 in the microcomputer 11. Therefore, the description of the motor controller of the fourth embodiment will be provided only with respect to a circuit configuration or the like, which is different from the circuit configuration or the like in the motor controller 20 of the first embodiment.

Figure 12:
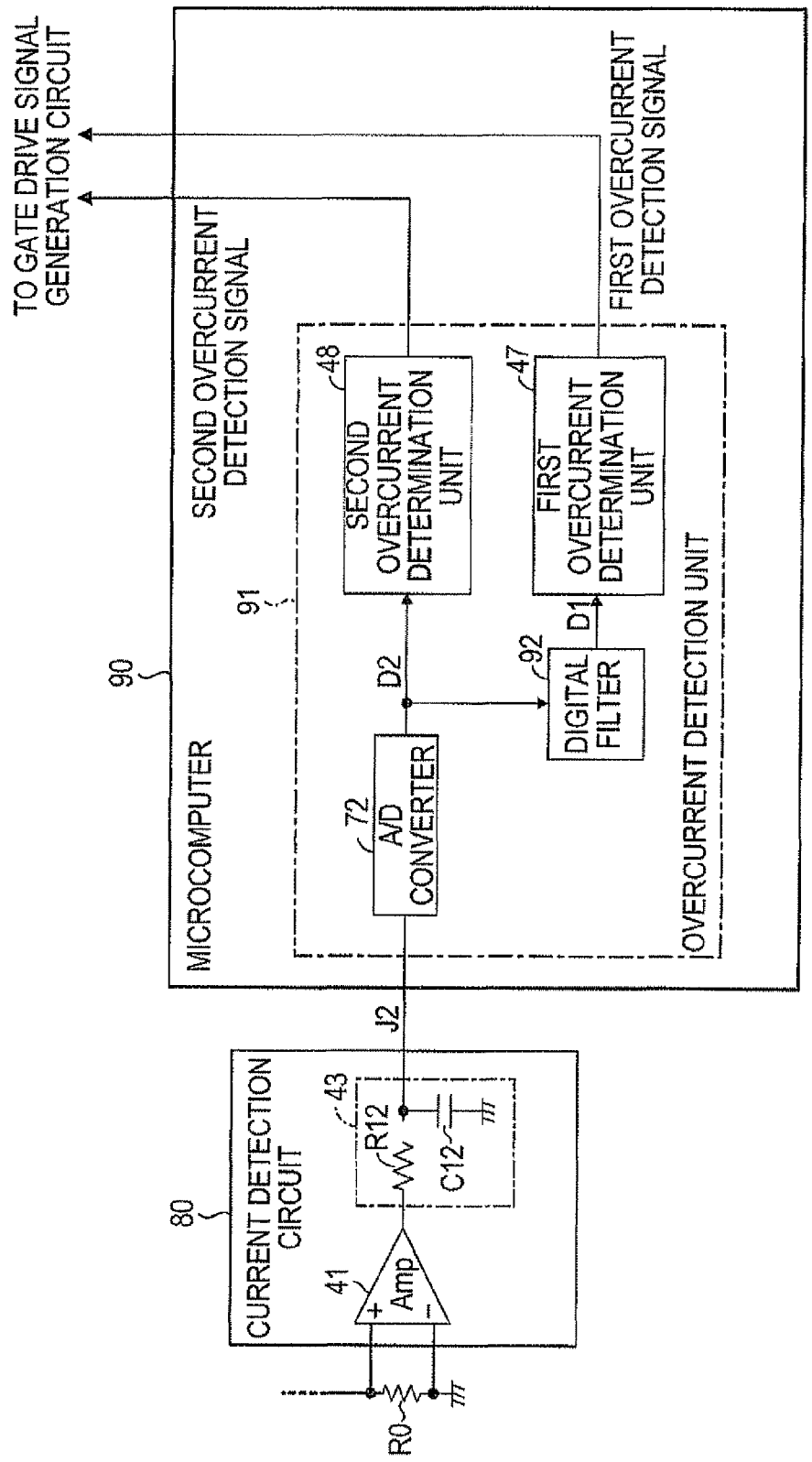
FIG. 12 is a configuration diagram showing specific configurations of a current detection circuit and an overcurrent detection unit in a fourth embodiment.

FIG. 12 shows specific configurations of a current detection circuit 80 and an overcurrent detection unit 91 in the fourth embodiment. As shown in FIG. 12, the current detection circuit 80 is constituted by the amplifier 41 and the second LPF 43 provided in the current detection circuit 13 (see FIG. 4) in the first embodiment. That is, the current detection circuit 80 extracts frequency components equal to or lower than the second cutoff frequency fc2 (that is, the instantaneous current signal J2 and containing components of the average current signal J1) from the current signal obtained from the current detection resistor R0 and inputs the frequency components to the overcurrent detection unit 91 in a microcomputer 90.

The overcurrent detection unit 91 in the microcomputer 90 includes the A/D converter 72, a digital filter 92, the first overcurrent determination unit 47, and the second overcurrent determination unit 48. The A/D converter 72 performs A/D conversion of the instantaneous current signal J2 inputted from the current detection circuit 80. The digital filter 92 extracts the average current signal corresponding to components of the frequency band equal to or lower than the first cutoff frequency fc1 from the instantaneous current signal digitalized by the A/D converter 72. The first overcurrent determination unit 47 determines whether or not the average current is an overcurrent based on a value of the average current signal (an average current value D1) from the digital filter 92. The second overcurrent determination unit 48 determines whether or not the instantaneous current is an overcurrent based on a value of the instantaneous current signal (an instantaneous current value D2) from the A/D converter 72.

Specifically, in the fourth embodiment, extraction of the signal components equal to or lower than the second cutoff frequency fc2 is performed by the analog filter in the current detection circuit 80. Then, extraction of the signal components equal to or lower than the first cutoff frequency fc1 is performed by the digital filter 92 in the microcomputer 90. In the overcurrent detection circuit 91, the digital filter 92 and the overcurrent determination units 47 and 48 are all realized by means of software processing by the microcomputer 90. Also, the overcurrent determination units 47 and 48 are the same as the respective overcurrent determination units 47 and 48 in the first embodiment.

In the fourth embodiment, the current detection resistor R0 corresponds to an example of a current detection unit in the present invention, the digital filter 92 corresponds to an example of a first filter in the present invention, and the second LPF 43 corresponds to an example of a second filter in the present invention. Also, in the fourth embodiment, the timer 25 and the first overcurrent determination unit 47 correspond to an example of a first overcurrent determination unit in the present invention, and the second overcurrent determination unit 48 corresponds to an example of a second overcurrent determination unit in the present invention.

According to the motor controller in the fourth embodiment described above, its hardware configuration can be simplified as compared with the first embodiment provided with two analog filters. Also, it is possible to rapidly extract the instantaneous current signal, which is required to be rapidly extracted, by the analog second LPF 43.

Modified Example

Although some embodiments of the present invention have been described above, the present invention should not at all be limited to these embodiments, but may be implemented in various forms within the technical scope of the present invention.

For example, while an LPF is used as a filter (the second LPF 43 or the second digital filter 74) for extracting the instantaneous current signal in the above-described embodiments, it may be configured such that only predetermined frequency bands including the PWM frequency are extracted using, for example, a bandpass filter. That is, it may be possible to employ a bandpass filter in which the second cutoff frequency fc2 is set as a maximum value of a passband, and a predetermined frequency lower than the second cutoff frequency fc2 and also lower than the PWM frequency (however, a frequency higher than 0 such as, for example, a frequency equal to or higher than the first cutoff frequency) is set as a minimum value of the passband.

Also, the values of the passbands of the filters in the above-described embodiments are mentioned only by way of example. The first cutoff frequency fc1 of the LPF to extract the average current signal may be appropriately set as long as the passband is not affected by the PWM control (i.e., lower than the PWM frequency) and allows appropriate extraction of the average current signal.

The passband of the filter to extract the instantaneous current signal may be appropriately set as long as it is possible to appropriately extract a desired instantaneous current signal, that is, signal components varying in accordance with the PWM control (varying in synchronization with the PWM frequency), and also is possible to appropriately eliminate high-frequency noises equal to or higher than a predetermined frequency higher than the PWM frequency (e.g., equal to or more than several times to a dozen times of the PWN frequency).

The circuit configurations of the respective LPF filters 42 and 43 shown in, for example, FIG. 4 are merely examples, and may be in various forms, including constituting, instead of the passive filter, an active filter in which an active device is used.

Although the average current is determined to be an overcurrent when the state where the value of the average current signal exceeds the first threshold value has continued for 3 seconds in the above embodiments, the continued time of 3 seconds is merely an example. Also, it is not always required to make a determination of an overcurrent based on the fact that the state where the value of the average current signal exceeds the first threshold value has continued for a predetermined time. It may be possible to make a determination of an overcurrent simply based on the fact of exceeding the first threshold value.

Moreover, in a case where the average current is determined to be an overcurrent by the first overcurrent determination unit (that is, in a case where the first overcurrent detection signal is outputted), the drive duty ratio is lowered to thereby restrict current in the above-described embodiments. However, to lower the drive duty ratio is merely an example, and various protection methods may be employed as long as the method can reduce the average current to thereby protect the battery 19 appropriately.

The same is applicable to protection methods against an overcurrent of the instantaneous current. To forcibly turn off the drive switch, which is currently ON, only in the current ON-cycle, as in the above-described embodiments, is merely an example, and various protection methods may be employed as long as the value of the instantaneous current signal can be controlled to be equal to or lower than the second threshold value.

In the above-described embodiments, the digital filter is realized by means of software processing by the microcomputer. However, the digital filter may be realized by means of hardware, such as a DSP (Digital Signal Processor). Alternatively, the microcomputer itself may be replaced with another device having an equivalent function (such as a DSP, an ASIC (Application Specific Integrated Circuit), or a programmable logic device).

Although the rechargeable circular saw is described, by way of example, as an electric power tool to which the present invention is applied in the above-described embodiments, it is to be understood that application of the present invention should not be limited to the rechargeable circular saw. The present invention may be applied to any electric power tool which is provided with a brushless motor as a drive source and is configured to operate on electric power from a battery.

What is claimed is:

1. A motor current detection apparatus comprising:
   a current detection unit configured to detect a conduction current flowing from a battery to a brushless motor and output a conduction current signal corresponding to the detected conduction current;
   a first filter configured to extract a first current signal which is included in the conduction current signal outputted from the current detection unit and is a signal component in a frequency band equal to or lower than a predetermined first cutoff frequency;
   a second filter configured to extract a second current signal which is included in the conduction current signal outputted from the current detection unit and is a signal component in a predetermined frequency band within a frequency band equal to or lower than a predetermined second cutoff frequency higher than the first cutoff frequency and having the second cutoff frequency as a maximum value;
   a first comparison circuit that is configured to compare a value of the first current signal and a previously set first threshold value, and to output to a first overcurrent determination unit a first comparison signal having one of a High level and a Low level depending on whether or not the value of the first current signal exceeds the first threshold value, the first overcurrent determination unit being configured to determine that a first current corresponding to the first current signal is an overcurrent in a case where the first comparison signal from the first comparison circuit has a level indicating that the value of the first current signal exceeds the first threshold value; and
   a second comparison circuit that is configured to compare a value of the second current signal and a previously set second threshold value larger than the first threshold value, and to output to a second overcurrent determination unit a second comparison signal having one of a High level and a Low level depending on whether or not the value of the second current signal exceeds the second threshold value, the second overcurrent determination unit being configured to determine that a second current corresponding to the second current signal is an overcurrent in a case where the second comparison signal from the second comparison circuit has a level indicating that the value of the second current signal exceeds the second threshold value.

2. The motor current detection apparatus according to claim 1,
wherein the first filter is a low-pass filter configured to extract the first current signal in the frequency band equal to or lower than the first cutoff frequency from the conduction current signal, and
wherein the second filter is a low-pass filter configured to extract the second current signal in the frequency band equal to or lower than the second cutoff frequency from the conduction current signal.

3. The motor current detection apparatus according to claim 1,
wherein the conduction current flowing from the battery to the brushless motor is adapted to be PWM controlled at a predetermined PWM frequency by a switching element, and
wherein the first cutoff frequency is set to a value lower than the PWM frequency and higher than zero, and the second cutoff frequency is set to a value equal to or higher than the PWM frequency.

4. The motor current detection apparatus according to claim 3, wherein the first cutoff frequency is set to a value within a range of 100 Hz to 5 kHz, and the second cutoff frequency is set to a value within a range of 10 kHz to 500 kHz.

5. The motor current detection apparatus according to claim 1, wherein the first filter and the second filter are constituted by analog filters, the first filter being configured to output the first current signal as an analog signal and the second filter being configured to output the second current signal as an analog signal.

6. The motor current detection apparatus according to claim 5, wherein each of the analog filters is constituted as a passive filter including a resistor and a capacitor.

7. A motor controller comprising:
a motor current detection apparatus including:
a current detection unit configured to detect a conduction current flowing from a battery to a brushless motor and output a conduction current signal corresponding to the detected conduction current;
a first filter configured to extract a first current signal which is included in the conduction current signal outputted from the current detection unit and is a signal component in a frequency band equal to or lower than a predetermined first cutoff frequency; and
a second filter configured to extract a second current signal which is included in the conduction current signal outputted from the current detection unit and is a signal component in a predetermined frequency band within a frequency band equal to or lower than a predetermined second cutoff frequency higher than the first cutoff frequency and having the second cutoff frequency as a maximum value;
a current conduction control unit configured to control current conduction from the battery to the brushless motor;
a first overcurrent determination unit configured to determine that a first current corresponding to the first current signal is an overcurrent in a case where a value of the first current signal extracted by the first filter exceeds a previously set first threshold value; and
a second overcurrent determination unit configured to determine that a second current corresponding to the second current signal is an overcurrent in a case where a value of the second current signal extracted by the second filter exceeds a previously set second threshold value larger than the first threshold value,
wherein the current conduction control unit is configured to perform one of interruption and restriction of current conduction from the battery to the brushless motor in a case where it is determined by at least one of the first overcurrent determination unit and the second overcurrent determination unit that at least one of the first current and the second current is an overcurrent.

8. The motor controller according to claim 7, wherein the first overcurrent determination unit is configured to determine that the first current is an overcurrent when a state, where the value of the first current signal extracted by the first filter exceeds the first threshold value, has continued for a predetermined threshold value exceeding time period or more.

9. The motor controller according to claim 7,
wherein the first filter and the second filter are constituted by analog filters, the first filter being configured to output the first current signal as an analog signal and the second filter being configured to output the second current signal as an analog signal, and
wherein the first overcurrent determination unit and the second overcurrent determination unit are realized by means of software processing by a microcomputer.

10. The motor controller according to claim 7,
wherein the first filter and the second filter are constituted by analog filters, the first filter being configured to output the first current signal as an analog signal and the second filter being configured to output the second current signal as an analog signal,
wherein the first overcurrent determination unit includes an analog first comparison circuit that is configured to compare the value of the first current signal and the first threshold value, and to output a first comparison signal having one of a High level and a Low level depending on whether or not the value of the first current signal exceeds the first threshold value,
wherein the first overcurrent determination unit is configured to determine that the first current is an overcurrent in a case where the first comparison signal from the first comparison circuit has a level indicating that the value of the first current signal exceeds the first threshold value,
wherein the second overcurrent determination unit includes an analog second comparison circuit that is configured to compare the value of the second current signal and the second threshold value, and to output a second comparison signal having one of a High level and a Low level depending on whether or not the value of the second current signal exceeds the second threshold value, and
wherein the second overcurrent determination unit is configured to determine that the second current is an overcurrent in a case where the second comparison signal from the second comparison circuit has a level indicating that the value of the second current signal exceeds the second threshold value.

11. The motor controller according to claim 10,
wherein the first overcurrent determination unit includes a time measurement unit that is configured to measure, in a case where the first comparison signal having a level indicating that the value of the first current signal exceeds the first threshold value is outputted from the first comparison circuit, a time for which the output continues, and wherein the first overcurrent determination unit is configured to determine that the first current is an overcurrent when a measured time by the time measurement unit exceeds a predetermined threshold value exceeding duration.

12. The motor controller according to claim 7, wherein the first filter and the second filter are constituted by digital filters, the first filter being configured to output the first current signal as a digital signal and the second filter being configured to output the second current signal as a digital signal, and wherein the first filter, the second filter, the first overcurrent determination unit, and the second overcurrent determination unit are realized by means of software processing by a microcomputer.

13. The motor controller according to claim 7, wherein the second filter is constituted by an analog filter and is configured to output the second current signal as an analog signal, wherein the first filter is constituted by a digital filter that is configured to be inputted with the second current signal outputted from the second filter, to extract the first current signal from the second current signal, and to output the first current signal as a digital signal, and wherein the first filter, the first overcurrent determination unit, and the second overcurrent determination unit are realized by means of software processing by a microcomputer.

14. An electric power tool comprising:

a battery;

a brushless motor as a drive source configured to be rotated by electric power supplied from the battery; and a motor current detection apparatus including:

a current detection unit configured to detect a conduction current flowing from a battery to a brushless motor and output a conduction current signal corresponding to the detected conduction current;

a first filter configured to extract a first current signal which is included in the conduction current signal outputted from the current detection unit and is a signal component in a frequency band equal to or lower than a predetermined first cutoff frequency;

a second filter configured to extract a second current signal which is included in the conduction current signal outputted from the current detection unit and is a signal component in a predetermined frequency band within a frequency band equal to or lower than a predetermined second cutoff frequency higher than the first cutoff frequency and having the second cutoff frequency as a maximum value;

a current conduction control unit configured to control current conduction from the battery to the brushless motor;

a first overcurrent determination unit configured to determine that a first current corresponding to the first current signal is an overcurrent in a case where a value of the first current signal extracted by the first filter exceeds a previously set first threshold value; and a second overcurrent determination unit configured to determine that a second current corresponding to the second current signal is an overcurrent in a case where a value of the second current signal extracted by the second filter exceeds a previously set second threshold value larger than the first threshold value;

wherein the current conduction control unit is configured to perform one of interruption and restriction of current conduction from the battery to the brushless motor in a case where it is determined by at least one of the first overcurrent determination unit and the second overcurrent determination unit that at least one of the first current and the second current is an overcurrent.

\* \* \* \* \*